US012722596B2

(12) United States Patent
Bryzek

(10) Patent No.: US 12,722,596 B2
(45) Date of Patent: Sep. 1, 2026

(54) VEHICLE ANTI-THEFT APPARATUS AND METHOD

(71) Applicant: Steve Bryzek, Salem, WI (US)

(72) Inventor: Steve Bryzek, Salem, WI (US)

( * ) Notice: Subject to any disclaimer, the term of this patent is extended or adjusted under 35 U.S.C. 154(b) by 65 days.

(21) Appl. No.: 18/883,467

(22) Filed: Sep. 12, 2024

(65) Prior Publication Data

US 2026/0208691 A1 Jul. 23, 2026

Related U.S. Application Data

(60) Provisional application No. 63/603,688, filed on Nov. 29, 2023.

(51) Int. Cl.
*B60R 25/045* (2013.01)
*B60R 25/102* (2013.01)
(Continued)

(52) U.S. Cl.
CPC .......... *B60R 25/045* (2013.01); *B60R 25/102* (2013.01); *B60R 25/33* (2013.01);
(Continued)

(58) Field of Classification Search
CPC ..... B60R 25/045; B60R 25/102; B60R 25/33; B60R 2325/101; B60R 2325/103; B60R 2325/105; B60R 2325/106; B60R 2325/202; B60R 2325/205; B60R 2022/4883; H04W 8/20; H04L 67/125; B60W 2556/45; B60W 2556/50; B60K 28/063; B60K 2028/003; B60K 2360/573;
(Continued)

(56) References Cited

U.S. PATENT DOCUMENTS 3,718,128 A * 2/1973 Botker .................. F02N 11/105
123/179.5
3,726,265 A * 4/1973 Howard .................... F02P 1/08
123/198 DC
(Continued)

FOREIGN PATENT DOCUMENTS

BR PI0722136 B1 5/2018
CN 117048551 A 11/2014
(Continued)

OTHER PUBLICATIONS

Translation of JP2017114156A retrieved from Espacenet on Jan. 9, 2025 (Year: 2025).*

*Primary Examiner* — Fadey S. Jabr
*Assistant Examiner* — Faris Asim Shaikh
(74) *Attorney, Agent, or Firm* — Lesavich High-Tech Law Group, S.C.; Stephen Lesavich

(57) ABSTRACT

A vehicle anti-theft apparatus and method. The vehicle anti-theft apparatus includes a wireless interface to receive wireless messages from other network devices (e.g., smart phones, tablets, wearables, etc.) to apply a kill switch signal to a vehicle to disable a vehicle and prevent the vehicle from being restarted, provide Global Positioning System (GPS) physical location information of the vehicle to law enforcement in real-time (i.e., 1 to 2 seconds, etc.), and remove the kill switch signal to allow the vehicle to be restarted. The kill switch signal proactively prevents vehicle theft and also helps law enforcement locate the disabled vehicle after a car theft and/or car-jacking.

21 Claims, 8 Drawing Sheets

(51) Int. Cl.
*B60R 25/33* (2013.01)
*H04W 8/20* (2009.01)

(52) U.S. Cl.
CPC ......... *H04W 8/20* (2013.01); *B60R 2325/101* (2013.01); *B60R 2325/103* (2013.01); *B60R 2325/105* (2013.01); *B60R 2325/106* (2013.01); *B60R 2325/202* (2013.01); *B60R 2325/205* (2013.01)

(58) Field of Classification Search
CPC .............. B60K 2028/006; B60K 28/00; B60K 2360/5905
See application file for complete search history.

(56) References Cited

U.S. PATENT DOCUMENTS 3,780,311 A * 12/1973 Brown ................. B60K 28/063 307/10.6
4,233,950 A * 11/1980 Krolski .................... F02P 11/04 123/149 D
4,901,058 A * 2/1990 Comeau ............... B60K 28/063 340/576
6,025,653 A * 2/2000 Hayashi .................. F02N 15/10 290/33
7,646,286 B2 1/2010 Harumoto
7,819,219 B2 10/2010 Lang
8,414,455 B2 4/2013 McCullogh
8,463,765 B2 6/2013 Lesavich
8,615,347 B2 12/2013 Gallego
9,037,564 B2 5/2015 Lesavich et al.
9,137,250 B2 9/2015 Lesavich et al.
9,361,479 B2 6/2016 Lesavich et al.
9,418,491 B2 8/2016 Phillips
9,569,771 B2 2/2017 Lesavich et al.
9,988,058 B2 6/2018 Phillips
10,065,653 B1 9/2018 Phillips
10,300,924 B2 5/2019 Phillips
10,493,996 B2 12/2019 Phillips et al.
10,510,193 B2 12/2019 Wells et al.
10,796,317 B2 10/2020 Wells
11,161,519 B2 11/2021 Phillips et al.
11,202,178 B2 * 12/2021 Huang .................... H04W 4/08
11,423,417 B2 8/2022 Wells
11,482,057 B2 10/2022 Wells
11,627,907 B2 4/2023 Wells
2005/0073389 A1 * 4/2005 Chandley .............. G06F 21/554 340/5.31
2005/0283302 A1 * 12/2005 Zakrewski .......... B60R 25/1003 701/112
2006/0021098 A1 * 1/2006 Tezuka ................. H01H 47/002 477/7
2006/0066150 A1 * 3/2006 Kiuchi .................... B60R 25/24 340/5.2
2008/0006466 A1 1/2008 Vickers
2009/0150267 A1 * 6/2009 Sherman ................ G06Q 10/10 707/E17.014
2010/0012417 A1 * 1/2010 Walter ................. B60K 28/063 455/556.1
2011/0208710 A1 8/2011 Lesavich
2011/0304465 A1 * 12/2011 Boult ..................... B60K 28/06 340/576
2012/0075630 A1 3/2012 Wells
2012/0278622 A1 11/2012 Lesavich et al.
2013/0002413 A1 * 1/2013 Du ........................ H04W 4/029 340/426.1
2014/0189792 A1 7/2014 Lesavich et al.
2015/0379301 A1 12/2015 Lesavich et al.
2016/0049014 A1 2/2016 Wells et al.
2016/0086397 A1 3/2016 Philips
2016/0321654 A1 11/2016 Lesavich et al.
2016/0347325 A1 12/2016 Phillips
2017/0262863 A1 9/2017 Wells
2018/0260822 A1 9/2018 Wells
2018/0273049 A1 9/2018 Phillips
2019/0009788 A1 1/2019 Phillips
2019/0182634 A1 * 6/2019 Meredith ................ H04W 4/02
2019/0229895 A1 * 7/2019 Finkelstein ............ H04B 10/40
2020/0101981 A1 4/2020 Phillips et al.
2021/0183174 A1 6/2021 Wells
2022/0277650 A1 * 9/2022 Mondello ............ G08G 1/0965
2023/0385463 A1 * 11/2023 Raju ..................... H04L 61/103

FOREIGN PATENT DOCUMENTS

CN 112590709 A 4/2021
JP 3578017 B2 10/2004
JP 2017114156 A * 6/2017
KR 101627741 B1 6/2016
TW I663571 B 6/2019

* cited by examiner 10
34
32
12
52
58
GPS
LOCATION
INFO
40a
40b
40
BATTERY
LAW ENFORCEMENT
GPS
56
29, 29'
KILL SWITCH
SIGNAL
54
SaaS
NETWORK
20, 20'
28s
29', 29"
42
28"
14
18
44
POWER
16
23
12
26
COMPUTER
READABLE
MEDIUM
28
28'
CIRCUIT
22
46
PROCESSOR
24
GPS
30
48
36
POWER
23'
38
GROUND
WEARABLES
50

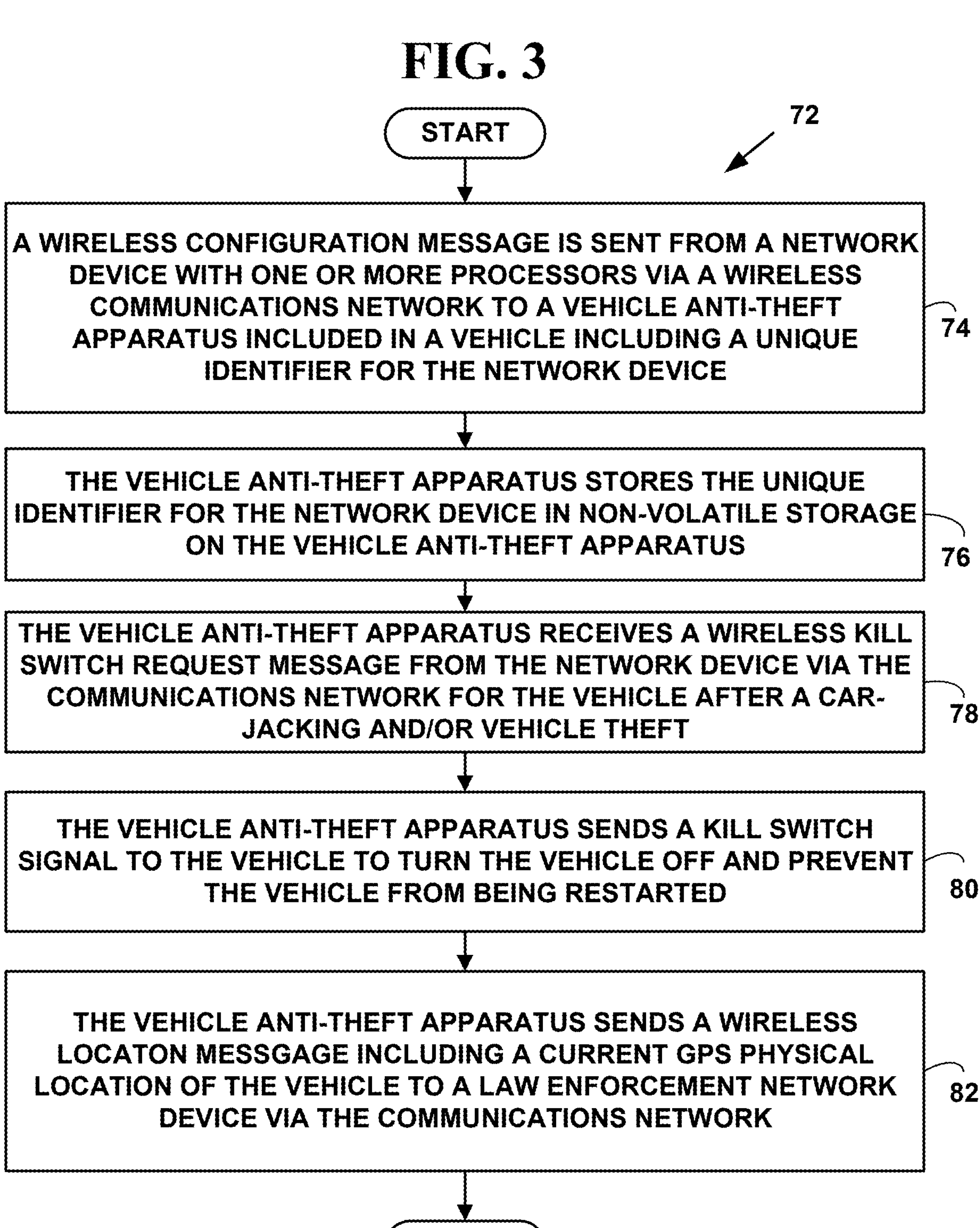
FIG. 3
START
72
A WIRELESS CONFIGURATION MESSAGE IS SENT FROM A NETWORK DEVICE WITH ONE OR MORE PROCESSORS VIA A WIRELESS COMMUNICATIONS NETWORK TO A VEHICLE ANTI-THEFT APPARATUS INCLUDED IN A VEHICLE INCLUDING A UNIQUE IDENTIFIER FOR THE NETWORK DEVICE
74
THE VEHICLE ANTI-THEFT APPARATUS STORES THE UNIQUE IDENTIFIER FOR THE NETWORK DEVICE IN NON-VOLATILE STORAGE ON THE VEHICLE ANTI-THEFT APPARATUS
76
THE VEHICLE ANTI-THEFT APPARATUS RECEIVES A WIRELESS KILL SWITCH REQUEST MESSAGE FROM THE NETWORK DEVICE VIA THE COMMUNICATIONS NETWORK FOR THE VEHICLE AFTER A CAR-JACKING AND/OR VEHICLE THEFT
78
THE VEHICLE ANTI-THEFT APPARATUS SENDS A KILL SWITCH SIGNAL TO THE VEHICLE TO TURN THE VEHICLE OFF AND PREVENT THE VEHICLE FROM BEING RESTARTED
80
THE VEHICLE ANTI-THEFT APPARATUS SENDS A WIRELESS LOCATON MESSGAGE INCLUDING A CURRENT GPS PHYSICAL LOCATION OF THE VEHICLE TO A LAW ENFORCEMENT NETWORK DEVICE VIA THE COMMUNICATIONS NETWORK
82
END

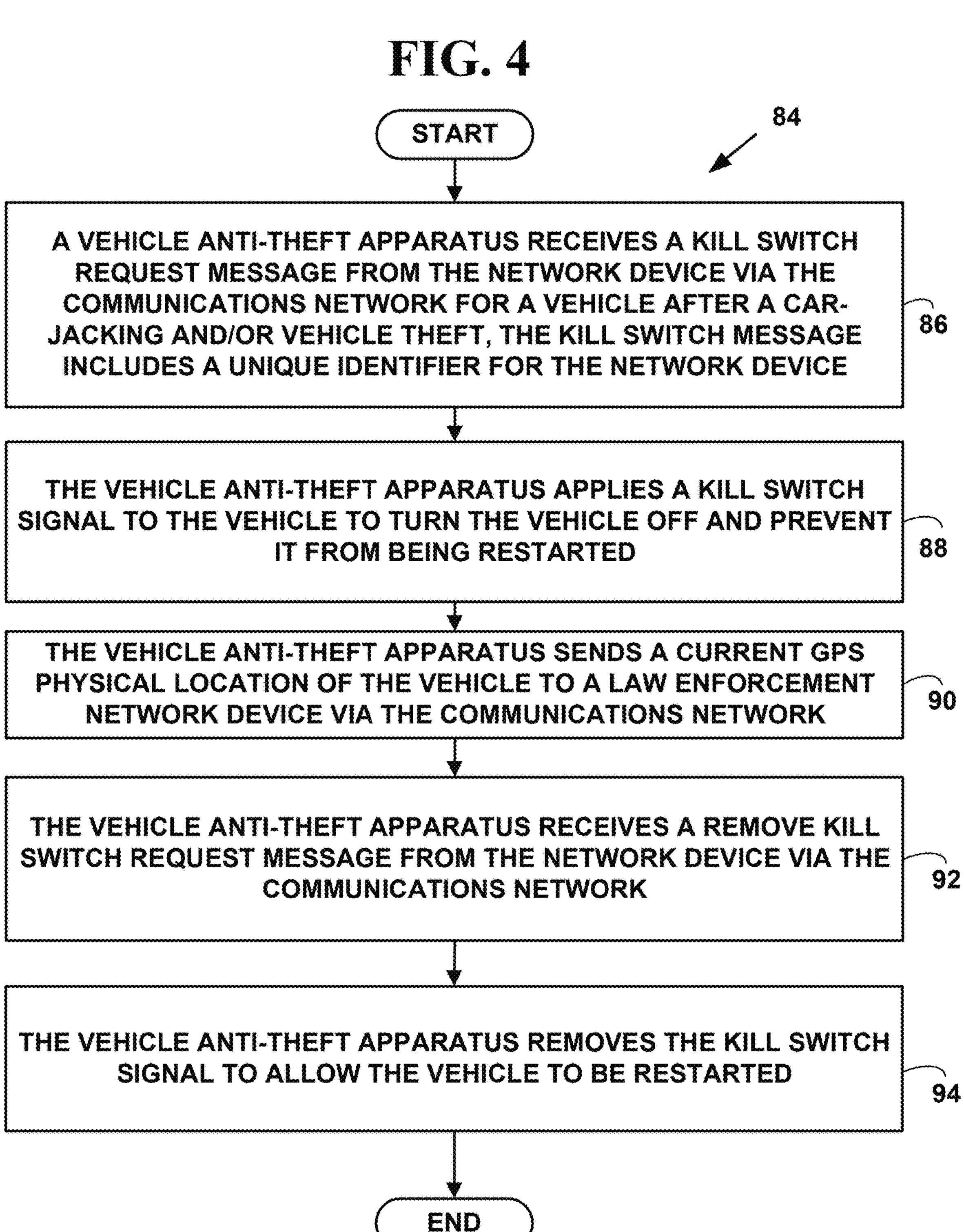
FIG. 4
START
84
A VEHICLE ANTI-THEFT APPARATUS RECEIVES A KILL SWITCH REQUEST MESSAGE FROM THE NETWORK DEVICE VIA THE COMMUNICATIONS NETWORK FOR A VEHICLE AFTER A CAR-JACKING AND/OR VEHICLE THEFT, THE KILL SWITCH MESSAGE INCLUDES A UNIQUE IDENTIFIER FOR THE NETWORK DEVICE
86
THE VEHICLE ANTI-THEFT APPARATUS APPLIES A KILL SWITCH SIGNAL TO THE VEHICLE TO TURN THE VEHICLE OFF AND PREVENT IT FROM BEING RESTARTED
88
THE VEHICLE ANTI-THEFT APPARATUS SENDS A CURRENT GPS PHYSICAL LOCATION OF THE VEHICLE TO A LAW ENFORCEMENT NETWORK DEVICE VIA THE COMMUNICATIONS NETWORK
90
THE VEHICLE ANTI-THEFT APPARATUS RECEIVES A REMOVE KILL SWITCH REQUEST MESSAGE FROM THE NETWORK DEVICE VIA THE COMMUNICATIONS NETWORK
92
THE VEHICLE ANTI-THEFT APPARATUS REMOVES THE KILL SWITCH SIGNAL TO ALLOW THE VEHICLE TO BE RESTARTED
94
END

PLACING THE VEHICLE ANTI-THEFT APPARATUS IN PLURAL VEHICLES

114

PLACING IN A DATABASE WITH A VEHICLE ANTI-THEFT APPLICATION ON A SERVER NETWORK DEVICE WITH ONE MORE PROCESSORS, INFORMATION INCLUDING A FIRST SET OF PLURAL UNIQUE IDENTIFIERS ABOUT A FIRST SET OF VEHICLES FROM THE PLURAL VEHICLES TO PROACTIVELY DISABLE THE FIRST SET OF VEHICLES TO HELP PREVENT THEFT OF THE FIRST SET OF VEHICLES

116

PLACING IN THE DATABASE WITH THE VEHICLE ANTI-THEFT APPLICATION ON THE SERVER NETWORK DEVICE INFORMATION INCLUDING A SECOND SET OF PLURAL UNIQUE IDENTIFIERS ABOUT A SECOND SET OF VEHICLES FROM THE PLURAL VEHICLES TO AID REPOSSESSION FOR THE SECOND SET OF VEHICLES WITH DRIVERS THAT HAVE NOT PAID THEIR VEHICLE PAYMENTS TO A BANK, CREDIT UNION OR FINANCING COMPANY

118

PLACING IN THE DATABASE WITH THE VEHICLE ANTI-THEFT APPLICATION ON THE SERVER NETWORK DEVICE A THIRD SET OF INFORMATION INCLUDING A THIRD SET OF UNIQUE IDENTIFERS ABOUT A THIRD SET RENTAL CAR VEHICLES INCLUDING INFORMATION FOR DRIVERS THAT HAVE NOT RETURNED THEIR RENTAL VEHICLES

120

FIG. 7B

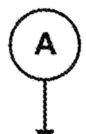

RECEIVING ON THE VEHICLE ANTI-THEFT APPLICATION ON THE SERVER NETWORK DEVICE A WIRELESS KILL SWITCH MESSAGE AFTER A SELECTED VEHICLE FROM THE PLURAL VEHICLES IS STOLEN, CARJACKED, REQUIRES REPOSSESSION, OR RENTAL COMPANY RETURN FROM A FIRST NETWORK DEVICE VIA THE WIRELESS COMMUNICATION NETWORK

122

APPLYING FROM THE VEHICLE ANTI-THEFT APPLICATION ON THE SERVER NETWORK DEVICE A WIRELESS KILL SWITCH SIGNAL WITH INFORMATION FROM THE DATABASE ABOUT THE SELECTED VEHICLE TO DISABLE THE SELECTED VEHICLE

124

END

VEHICLE ANTI-THEFT APPARATUS AND METHOD

CROSS REFERENCES TO RELATED APPLICATIONS

The U.S. Utility patent application claims priority from U.S. Provisional patent application No. 63/603,688, filed on Nov. 29, 2023, the contents of which are incorporated by reference.

FIELD OF INVENTION

This application relates to anti-theft devices for vehicles. More specifically, it relates to a vehicle anti-theft apparatus.

BACKGROUND OF THE INVENTION

Many vehicles are stolen each year. In 2022, the U.S. FBI estimated that over one million vehicles were stolen in the United States. Many of these vehicle thefts were the results of car-jacking events where the vehicle was stolen due to force, violence and/or physical intimidation applied to a driver of the vehicle.

Many stolen vehicles are used for other crimes and are often damaged (e.g., crashed, set on fire, stripped of parts, etc.) and left abandoned only to be re-discovered by citizens or law enforcement after a long period of time has passed.

There are many anti-theft devices that can be used to disable a vehicle that has been stolen.

However, there are a number of problems associated with anti-theft devices used with the vehicles.

One problem is that anti-theft devices are not specifically set up to work with only one specific network device such as a cell phone, tablet, computer, etc.

One problem is that anti-theft devices are not specifically set up to work with a personal network device owned by the owner of the vehicle such as a personal cell phone, tablet, computer, etc.

Another problem that anti-theft devices do not allow a kill switch to be used from one specific or personal network device to turn on a kill switch to disable a vehicle, prevent it from being restarted and to turn off a kill signal to enable the vehicle to start again from the one specific or personal network device.

Another problem is that anti-theft devices do not disable a vehicle with a kill switch and immediately in real-time (i.e., 1 to 2 seconds) send Global Positioning System (GPS) current physical location information to law enforcement to locate and recover a disabled vehicle that has been stolen or carjacked.

Another problem is that anti-theft devices do not allow a vehicle to be proactively disabled by personal network device with a unique identifier (network, personal, etc.) only for a personal or specific cell phone, tablet, computer, etc. to prevent theft.

Another problem is that anti-theft devices do not prevent spoofing by others who are not the owner/driver of the vehicle.

Another problem is that anti-theft devices do not allow a vehicle to be disabled using a personal wearable device or a smart speaker device from a home or office environment.

Thus, it is desirable to solve some of the problems associated with anti-theft devices for vehicles.

SUMMARY OF THE INVENTION

In accordance with preferred embodiments of the present invention, some of the problems associated with the theft of vehicles are overcome. A vehicle anti-theft apparatus and method is presented.

The vehicle anti-theft apparatus includes a wireless interface to receive wireless messages from other network devices (e.g., smart phones, tablets, wearables, etc.) to apply a kill switch signal to a vehicle to disable a vehicle and prevent the vehicle from being restarted, provide Global Positioning System (GPS) physical location information of the vehicle to law enforcement in real-time (i.e., 1 to 2 seconds, etc.), and remove the kill switch signal to allow the vehicle to be restarted. The kill switch signal proactively prevents vehicle theft and also helps law enforcement locate the disabled vehicle after a car theft and/or car-jacking.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein:

FIG. 3 is a flow diagram illustrating a method for sending a kill switch signal to a vehicle anti-theft apparatus;

FIG. 4 is a flow diagram illustrating a method for sending a kill switch signal to a vehicle anti-theft apparatus;

FIGS. 7A and 7B are a flow diagram illustrating a method for sending a kill switch signal to a vehicle anti-theft apparatus.

DETAILED DESCRIPTION OF PREFERRED EMBODIMENTS

Exemplary Vehicle Anti-Theft Apparatus

Figure 1:
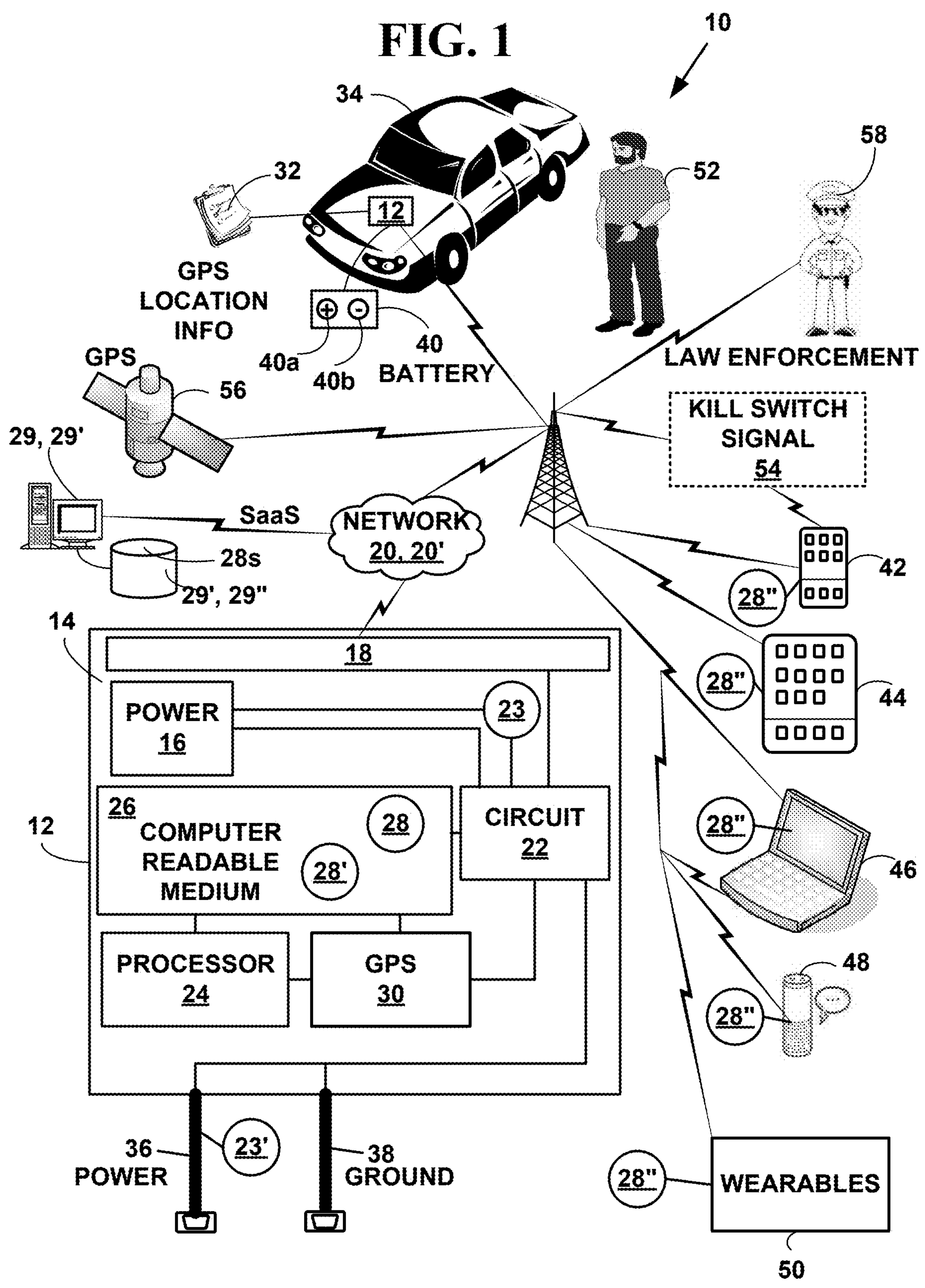
FIG. 1 is a block diagram illustrating a vehicle anti-theft apparatus.

FIG. 1 is a block diagram 10 illustrating a vehicle anti-theft apparatus 12.

The apparatus 12 comprises a case component 14, a power supply 16, a wireless interface 18, for receiving wireless signals from a wireless communications network 20, 20', a control circuit 22, for controlling the apparatus 12, a first diode 23 connected to the control circuit, one or more processors 24 for processing wireless data, a non-transitory computer readable medium 26 for including instructions 28 for controlling the one or more processors 24, a Global Positioning System (GPS) 30 component for providing GPS physical geographic location information 32 for a vehicle 34, a power wire connector 36 to supply power to the apparatus from the vehicle 34, a second diode 23'connected to the power wire connector 36, a ground wire connector 38 to provide a ground to the apparatus 12 from the vehicle, the power wire connector 36 and the ground wire connector connected to a battery 40 for the vehicle 34, one or more network devices 42, 44, 46, 48, 50 (FIG. 2, 62-70), each with one or more processors and a non-transitory computer readable medium, for allowing an owner/driver 52 of the vehicle to send a kill switch signal 54 from the one or more network devices 42, 44, 46, 48, 50 (FIG. 2, 62-70) via the wireless communications network 20, 20'to disable the vehicle 34 after it has been carjacked and/or stolen, the GPS location information 32 for the vehicle 34 obtained from a GPS satellite 56 and immediately provided to law enforcement 58 in real-time (i.e., 1-2 seconds, etc.). However, the present invention is not limited to such an embodiment and more, fewer, other and more or fewer components can be used to practice the invention.

The case component 14 includes, but is not limited to, plastic, rubber, wood, metal, paper, composite materials and/or other types of materials to provide a durable case.

The whole case component 14 and/or separate components and combinations thereof, are injection molded, extruded, pultruded, pull-winded, 3D-printed and/or manufactured and/or produced with other techniques using one or more the materials described herein. However, the present invention is not limited to such an embodiment and more, fewer or other types manufacturing techniques can be used to practice the invention.

"Injection molding" is a manufacturing process for producing parts by injecting molten material into a mold. Injection molding can be performed with a host of materials mainly including metals (for which the process is called die-casting), glasses, elastomers, confections and most commonly thermoplastic and thermosetting polymers.

Material for an injection molded part is fed into a heated barrel, mixed (e.g., using a helical shaped screw, etc.), and injected into a mold cavity, where it cools and hardens to the configuration of the cavity. After a product is designed, usually by an industrial designer or an engineer, molds are made by a mold-maker (or toolmaker) from metal, usually either steel or aluminum, and precision machined to form the features of the desired part. Injection molding is widely used for manufacturing a variety of parts, from the smallest components to entire body panels of cars. Advances in 3D printing technology, using photopolymers that do not melt during the injection molding of some lower temperature thermoplastics, can be used for some simple injection molds.

"Extrusion" is a manufacturing process where a material is pushed and/or drawn through a die to create long objects of a fixed cross-section. Hollow sections are usually extruded by placing a pin or mandrel in the die. Extrusion may be continuous (e.g., producing indefinitely long materials, etc.) or semi-continuous (e.g., repeatedly producing many shorter pieces). Some extruded materials are hot drawn and others may be cold drawn.

The feedstock may be forced through the die by various methods: by an auger, which can be single or twin screw, powered by an electric motor; by a ram, driven by hydraulic pressure, oil pressure or in other specialized processes such as rollers inside a perforated drum for the production of many simultaneous streams of material.

In one embodiment, case component 14 comprises extruded plastic materials including, but not limited to, Polyvinyl Chloride (PVC), Acrylonitrile Butadiene Styrene (ABS), High Impact Polypropylene (HIP), Polypropylene, High-Density Polyethylene (HDPE), Polycarbonate, Polyethylene Terephthalate Glycol (PETG), Nylon, Fiber reinforced Polypropylene, Fiber Reinforced Plystyrene and other types of plastics. In another embodiment, the case component 14 comprises composite materials. In another embodiment, the case component 14 comprises recycled plastic materials. However, the present invention is not limited to such embodiments and other embodiments can also be used to practice the invention.

Plastic extrusion commonly uses plastic chips, which are heated and extruded in the liquid state, then cooled and solidified as it passes through the die. In some cases (such as fiber reinforced tubes) the extrudate is pulled through a very long die, in a process called "pultrusion." However, the present invention is not limited to such embodiments and other embodiments can also be used to practice the invention.

"Pultrusion" is a manufacturing process for producing continuous lengths of materials. Pultrusion raw materials include a liquid resin mixture (e.g., containing resin, fillers and specialized additives) and reinforcing fibers (e.g., fiberglass, composite materials, etc.). The process involves pulling these raw materials (rather than pushing as is the case in extrusion) through a heated steel forming die using a continuous pulling device. The reinforcement materials are in continuous forms such as rolls of fiberglass mat or doffs of fiberglass roving. As the reinforcements are saturated with the resin mixture in the resin impregnator and pulled through the die, the gelation (or hardening) of the resin is initiated by the heat from the die and a rigid, cured profile is formed that corresponds to the shape of the die.

Protruded laminates are also used. Most pultruded laminates are formed using rovings aligned down the major axis of the part. Various continuous strand mats, fabrics (e.g., braided, woven and knitted), and texturized or bulked rovings are used to obtain strength in the cross axis or transverse direction. However, the present invention is not limited to such embodiments and other embodiments can also be used to practice the invention.

The pultrusion process is normally continuous and highly automated. Reinforcement materials, such as roving, mat or fabrics, are positioned in a specific location using preforming shapers or guides to form a pultruson. The reinforcements are drawn through a resin bath where the material is thoroughly coated or impregnated with a liquid thermosetting resin. The resin-saturated reinforcements enter a heated metal pultrusion die. The dimensions and shape of the die define the finished part being fabricated. Inside the metal die, heat is transferred initiated by precise temperature control to the reinforcements and liquid resin. The heat energy activates the curing or polymerization of thermoset resin changing it from a liquid to a solid. The solid laminate emerges from the pultrusion die to the exact shape of the die cavity. The laminate solidifies when cooled and it is continuously pulled through the pultrusion machine and cut to the desired length. The process is driven by a system of caterpillar or tandem pullers located between the die exit and the cut-off mechanism.

In one embodiment, the pultrusion resins include bisphenol-a epichlorohydrin-based vinyl esters. In another embodiment, the resins include polyesters including isophthalic, orthophthalic, propylene-maleate, fire resistant, and high cross-link density. However, the present invention is not limited to these resins and other resins can be used to practice the invention.

In one embodiment, the pultrusions include re-enforcing fibers comprising, fiberglass fibers, composite fibers, etc. However, the present invention is not limited to these resins and other resins can be used to practice the invention.

One resin used in fiberglass pultrusions is a thermoset resin. The resin used in Polyvinyl Chloride (PVC) pultrusions are typical thermoplastic resins. In the pultrusion process, under heat and pressure, the rmoset resins and re-enforcing fibers form a new inert material that is impervious to temperature. Pultruded fiberglass physical properties do not change through the full temperature cycle up to temperatures of about 200 degrees Fahrenheit (° F). In direct contrast, PVC resins typically become unstable at temperatures greater than 155° F. However, the present invention is not limited to such embodiments and other embodiments can also be used to practice the invention.

Pultrusions, include but are not limited to, structures comprising: (1) HIGH STRENGTH—typically stronger than structural steel on a pound-for-pound basis; (2) LIGHTWEIGHT-Pultrusions are 20-25% the weight of steel and 70% the weight of aluminum. Pultruded products are easily transported, handled and lifted into place; (3) CORROSION/ROT RESISTANT-Pultruded products will not rot and are impervious to a broad range of corrosive elements; (4) NON-CONDUCTIVE fiberglass reinforced pultrusions have low thermal conductivity and are electrically nonconductive; (5) ELECTRO-MAGNETIC TRANSPARENT-Pultruded products are transparent to radio waves, microwaves and other electromagnetic frequencies; (6) DIMENSIONAL STABLE-The coefficient of thermal expansion of pultruded products is slightly less than steel and significantly less than aluminum; (7) LOW TEMPERATURE CAPABLE-FiberGlass fiber reinforced pultrusions exhibit excellent mechanical properties at very low temperatures, even-70° F. Tensile strength and impact strengths are greater at −70° F. than at +80° F; (8) AESTHETICLY PLEASING-Pultruded components are pigmented throughout the thickness of the part and can be made to virtually any desired custom color. Special surfacing veils are also available to create special surface appearances such as wood grain, marble, granite, etc. ; and (9) COST EFFECTIVE-pultruded products are typically cheaper than those made of metals, wood, etc. and other materials. However, the present invention is not limited to such embodiments and other embodiments can also be used to practice the invention.

In one embodiment, the case component 14 is 3D printed. A "3D printer" includes 3D printing or "Additive manufacturing." 3D printing is a process of making a three-dimensional solid object of virtually any shape from a digital model. 3D printing is achieved using an "additive process," where successive layers of material (e.g., plastics, composite materials, etc.) are laid down in different shapes. 3D printing is also considered distinct from traditional machining techniques, which mostly rely on the removal of material by methods such as cutting or drilling and are "subtractive" processes. However, the present invention is not limited to such embodiments and other embodiments can also be used to practice the invention.

In one embodiment, the plural protruding components and plural intruding components include additional fiberglass, plastic, ester, polyester, nylon, composite materials or other types of filaments or webbing to add additional strength to case component 14. The filaments or webbing are applied internally or externally to the pultruded case component 14. However, the present invention is not limited to such embodiments and other embodiments can also be used to practice the invention.

The power supply 16 includes an electronic device that supplies electric power to an electrical load. The primary function of a power supply is to convert one form of electrical energy to another and, as a result, power supplies are sometimes referred to as electric power converters. Some power supplies are discrete, stand-alone devices, whereas others are built into larger devices along with their loads. Every power supply must obtain the energy it supplies to its load, as well as any energy it consumes while performing that task, from an energy source. All power supplies have a power input, which connects to the energy source, and a power output that connects to the load. In many power supplies the power input and output consist of electrical connectors.

In one embodiment, the power supply 16 includes, but is not limited to, a DC power supply. A DC power supply is one that supplies a voltage of fixed polarity (either positive or negative) to its load. Depending on its design, a DC power supply may be powered from a DC source and/or from an AC source. DC power supplies, include, but are not limited to, batteries, thermocouples, solar cells, capacitors, etc.

A "battery" is a device consisting of one or more electrochemical cells that convert stored chemical energy into electrical energy. In one embodiment, the apparatus 12, includes a battery with life of about two-four weeks to allow for downloading from the apparatus 12. In one embodiment, a primary and a backup battery is used. However, the present invention is not limited to this embodiment and the invention can be practiced without a backup battery.

A" thermocouple" is a temperature-measuring device consisting of two dissimilar conductors that contact each other at one or more spots. It produces a voltage when the temperature of one of the spots differs from the reference temperature at other parts of the circuit.

A "solar cell" (also called a photovoltaic cell) is an electrical device that converts the energy of light directly into electricity by the photovoltaic effect.

A "capacitor" (originally known as a condenser) is a passive two-terminal electrical component used to store energy electrostatically in an electric field.

In another embodiment, the power supply 16 includes an AC power supply. An AC power supply typically takes the voltage from a main power source and lowers it to a desired voltage.

In another embodiment, the power supply 16 includes a switched-mode power supply (SMPS). In an SMPS, the AC mains input is directly rectified and then filtered to obtain a desired DC voltage. The resulting DC voltage is then switched on and off at a high frequency by electronic switching circuitry, thus producing an AC current that will pass through a high-frequency transformer or inductor, Switching occurs at a very high frequency (e.g., typically 10 kHz to 1 MHz), thereby enabling the use of transformers and filter capacitors that are much smaller, lighter, and less expensive than those found in linear power supplies operating at mains frequency. After the inductor or transformer secondary, the high frequency AC is rectified and filtered to produce the desired DC output voltage. In such an embodiment the power is obtained for the SMPS from power source on the vehicle 34.

In one embodiment, the power supply 16 includes a back-up power source. The back-up power source includes a power source that prevents tampering and allows the apparatus 12 to function is the power source within the vehicle 34.

However, the present invention is not limited to the power supplies discussed and other types of internal and/or external power supplies and/or other combinations of AC and DC power can be used to practice the invention.

In one embodiment, the apparatus 12 is in communications with a wireless communications network 20, 20' The wireless communications network 20, 20' includes, but is not limited to, the Internet, a wireless intranet, a wireless Local Area Network (WiLAN), a wireless LAN (WiLAN), a wireless Wide Area Network (WiWAN), a wireless Metropolitan Area Network (WiMAN), wireless Public Switched Telephone Network (WiPSTN), wireless mesh networks, cloud network, satellite network, and/or other types and combinations of wireless communications networks 20, 20' providing wireless communications with wireless communication protocols. The wireless network 20 20', may also be a connected to a wired network, including, but not limited to, the Internet, an intranet, Local Area Network (LAN), a LAN (LAN), a Wide Area Network (WAN), a Metropolitan Area Network (MAN), Public Switched Telephone Network (PSTN), mesh networks, cloud networks, and/or other types and combinations of wired communications networks.

In one embodiment of the present invention, the wireless interface 18 includes, but is not limited to, a wireless interface 18 for the wireless communications network 20, 20', including but not limited to, a cellular telephone, IEEE 802.11a, 802.11b, 802.11g, 802.11n, 802.15.4 (ZigBee), "Wireless Fidelity" (Wi-Fi), "Worldwide Interoperability for Microwave Access" (WiMAX), ETSI High Performance Radio Metropolitan Area Network (HIPERMAN), RF Home, Zigbee, BLUETOOTH, Infrared Data Association (IrDa), Industrial, Scientific and Medical (ISM), near field communications (NFC), machine-to-machine (M2M) communications, Rich Communications Suite/System (RCS), Internet of Things (IoT) and/or or other long range or short range wireless network interface 18. However, the present invention is not limited to the wireless interfaces and wireless network listed and other wireless interfaces 18 and wireless communications networks 20, 20', may be used to practice the invention.

The wireless cellular telephone interface includes, but is not limited to Code Division Multiple Access (CDMA), Time Division Multiple Access (TDMA), or other wireless technologies and also includes Packet Cellular Network (PCN), Global System for Mobile Communications, (GSM), Generic Packet Radio Services (GPRS), network/Personal Communications Services network (PCS), a Cellular Digital Packet Data (CDPD), Long Term Evolution (LTE), and/or other wireless interfaces.

PCS networks include network that cover a range of wireless, digital communications technologies and services, including cordless phones, mobile phones, voice mail, paging, faxing, mobile personal digital/data assistants (PDAs), etc. PCS devices are typically divided into narrowband and broadband categories.

Narrowband devices, which operates in the 900 MHz band of frequencies, typically provide paging, data messaging, faxing, and one-and two-way electronic messaging capabilities. Broadband devices, which operate in the 1850 MHz to 1990 MHz range typically provide two-way voice, data, and video communications. Other wireless technologies such as GSM, CDMA and TDMA are typically included in the PCS category.

GSM is another type of digital wireless technology widely used throughout Europe, in Australia, India, Africa, Asia, and the Middle East. GSM is gaining popularity in the United States. GSM is a wireless platform based on TDMA to digitize data. GSM includes not only telephony and Short Message Services (SMS) but also voice mail, call forwarding, facsimile, caller ID, Internet access, and e-mail.

SMS is type of communications service that enables a user to allow private message communications with another user. GSM typically operates at three frequency ranges: 900 MHz (GSM 900) in Europe, Asia and most of the rest of the world; 1800 MHZ (GSM 1800 or DCS 1800 or DCS) in a few European countries; and 1900 MHZ (GSM 1900 also called PCS 1900 or PCS) in the United States. GSM also operates in a dual-band mode including 900/1800 Mhz and a tri-band mode include 900/1800/1900 Mhz.

GPRS is a standard for wireless communications, which runs at speeds up to 150 kilo-bits-per-second ("kbit/s"). GPRS, which supports a wide range of bandwidths is an efficient use of limited bandwidth and is particularly suited for sending and receiving small bursts of data such as e-mail and Web browsing, as well as large volumes of data.

CDPD is a wireless standard providing two-way, 19.2-Kbps or higher packet data transmission over existing cellular telephone channels. As is known in the art, a Packet Cellular Network (PCN) includes various types of packetized cellular data.

Long-Term Evolution (LTE) commonly marketed as Fourth Generation (4G) and Fifth Generation (5G) LTE, is a standard for wireless communication of high-speed data for mobile phones and data terminals. It is based on the Global System for Mobile Communications (GSM)/Enhanced Data rates for GSM Evolution (EDGE) and Universal Mobile Telecommunications System (UMTS)/High Speed Packet Access (HSPA)[network technologies, increasing the capacity and speed using a different radio interface together with core network improvements.

802.11b is a short-range wireless network standard. The IEEE 802.11b standard defines wireless interfaces that provide up to 11 Mbps wireless data transmission to and from wireless devices over short ranges. 802.11a is an extension of the 802.11b and can deliver speeds up to 54 M bps. 802.11g deliver speeds on par with 802.11a. However, other 802.11XX interfaces can also be used and the present invention is not limited to the 802.11 protocols defined. The IEEE 802.11a, 802.11b and 802.11g standards are incorporated herein by reference.

Wi-Fi is a type of 802.11xx interface, whether 802.11b, 802.11a, dual-band, etc. Wi-Fi devices include an RF interface such as 2.4 GHz for 802.11b or 802.11g and 5GHz for 802.11a.

802.15.4 (Zigbee) is low data rate network standard used for mesh network devices such as sensors, interactive toys, smart badges, remote controls, and home automation. The 802.15.4 standard provides data rates of 250 kbps, 40 kbps, and 20 kbps., two addressing modes; 16-bit short and 64-bit IEEE addressing, support for critical latency devices, such as joysticks, Carrier Sense Multiple Access/Collision Avoidance, (CSMA-CA) channel access, automatic network establishment by a coordinator, a full handshake protocol for transfer reliability, power management to ensure low power consumption for multi-month to multi-year battery usage and up to 16 channels in the 2.4 GHz Industrial, Scientific and Medical (ISM) band (Worldwide), 10 channels in the 915 MHz (US) and one channel in the 868 MHz band (Europe). The IEEE 802.15.4-2003 standard is incorporated herein by reference.

WiMAX is an industry trade organization formed by leading communications component and equipment companies to promote and certify compatibility and interoperability of broadband wireless access equipment that conforms to the IEEE 802.16XX and ETSI HIPERMAN. HIPERMAN is the European standard for metropolitan area networks (MAN).

The IEEE The 802.16a and 802.16g standards are wireless MAN technology standard that provides a wireless alternative to cable, DSL and T1/E1 for last mile broadband access. It is also used as complimentary technology to connect IEEE 802.11XX hot spots to the Internet.

The IEEE 802.16a standard for 2-11 GHz is a wireless MAN technology that provides broadband wireless connectivity to fixed, portable and nomadic devices. It provides up to 50-kilometers of service area range, allows users to get broadband connectivity without needing direct line of sight with the base station, and provides total data rates of up to 280 Mbps per base station, which is enough bandwidth to simultaneously support hundreds of businesses with T1/E1-type connectivity and thousands of homes with DSL-type connectivity with a single base station. The IEEE 802.16g provides up to 100 Mbps.

The IEEE 802.16e standard is an extension to the approved IEEE 802.16/16a/16g standard. The purpose of 802.16e is to add limited mobility to the current standard which is designed for fixed operation.

The ESTI HIPERMAN standard is an interoperable broadband fixed wireless access standard for systems operating at radio frequencies between 2 GHZ and 11 GHz.

The IEEE 802.16a, 802.16e and 802.16g standards are incorporated herein by reference. WiMAX can be used to provide Wireless Link Prioritization (WLP).

The ETSI HIPERMAN standards TR 101 031, TR 101 475, TR 101 493-1 through TR 101 493-3, TR 101 761-1 through TR 101 761-4, TR 101 762, TR 101 763-1 through TR 101 763-3 and TR 101 957 are incorporated herein by reference. ETSI HIPERMAN can also be used to provide WLP.

In one embodiment of the invention, the WiMAX interface includes WiMAX 4G Long Term Evolution (LTE) interfaces. The ITU announced in December 2010 that WiMAX and LTE are 4G technologies. One of the benefits of 4G LTE is the ability to take advantage of advanced topology networks including those communications networks 20 such as optimized heterogeneous networks with a mix of macrocells with low power nodes such as picocells, femtocells and new relay nodes. LTE further improves the capacity and coverage, and helps ensures user fairness. 4G LTE also introduces multicarrier technologies for ultra-wide bandwidth use, up to 100 MHz of spectrum supporting very high data rates.

IEEE 802.15.4 (Zigbee) is low data rate network standard used for mesh network devices such as sensors, interactive toys, smart badges, remote controls, and home automation. The 802.15.4 standard provides data rates of 250 kbps, 40 kbps, and 20 kbps., two addressing modes; 16-bit short and 64-bit IEEE addressing, support for critical latency devices, such as joysticks, Carrier Sense Multiple Access/Collision Avoidance, (CSMA-CA) channel access, automatic network establishment by a coordinator, fully handshaked protocol for transfer reliability, power management to ensure low power consumption for multi-month to multi-year battery usage and up to 16 channels in the 2.4GHz ISM band (Worldwide), 10 channels in the 915 MHz (US) and one channel in the 868 MHz band (Europe). The IEEE 802.15.4-2003 standard is incorporated herein by reference.

BLUETOOTH (IEEE 802.15.1a) is a short-range radio frequency technology aimed at simplifying communications among network devices and between network devices. BLUETOOTH wireless technology supports both short-range point-to-point and point-to-multipoint connections. The BLUETOOTH Specification, GL 11r02, March 2005, prepared by the BLUETOOTH SIG, Inc. and the IEEE 802.15.1a standard are incorporated herein by reference.

Infra data association (IrDA) is a short-range radio wireless BLUETOOTH and/or wireless infrared communications.

Industrial, Scientific and Medical (ISM) are short-range radio wireless communications interfaces operating at 400 MHZ, 800 MHZ, and 900 Mhz. ISM sensors may be used to provide wireless information to practice the invention.

In one embodiment, of the invention, the wireless interface 18 includes a wireless personal area network (WPAN) interface. As is known in the art, a WPAN is a personal area network for interconnecting devices centered around an individual person's devices in which the connections are wireless. A WPAN interconnects all the ordinary computing and communicating devices that a person has on their desk (e.g. computer, etc.) or carry with them (e.g., PDA, mobile phone, smart phone, table computer two-way pager, etc.)

A key concept in WPAN technology is known as "plugging in." In the ideal scenario, when any two WPAN-equipped devices come into close proximity (within several meters and/or feet of each other) or within a few miles and/or kilometers of a central server (not illustrated), they can communicate via wireless communications as if connected by a cable. WPAN devices can also lock out other devices selectively, preventing needless interference or unauthorized access to secure information. Zigbee is one wireless protocol used on WPAN networks 20, 20'.

"Near field communication (NFC)" is a set of standards for smartphones and similar network devices to establish radio communication with each other by touching them together or bringing them into close proximity, usually no more than a few centimeters. Present applications include contactless transactions, data exchange, and simplified setup of more complex communications such as Wi-Fi. Communication is also possible between an NFC device and an unpowered NFC chip, called a "tag" including radio frequency identifier (RFID) tags and/or sensor.

NFC standards cover communications protocols and data exchange formats, and are based on existing radio-frequency identification (RFID) standards including ISO/IEC 14443 and FeliCa. These standards include ISO/IEC 1809 and those defined by the NFC Forum, all of which are incorporated by reference.

"Machine to machine (M2M)" refers to technologies that allow both wireless and wired systems to communicate with other devices of the same ability. M2M uses a device to capture an event which is relayed through a network (wireless, wired, etc.) to an application (software program), that translates the captured event into meaningful information. Such communication was originally accomplished by having a remote network of machines relay information back to a central hub for analysis, which would then be rerouted into a system like a personal computer.

However, modern M2M communication has expanded beyond a one-to-one connection and changed into a system of networks that transmits data many-to-one and many-to-many to plural different types of devices and appliances. The expansion of IP networks across the world has made it far easier for M2M communication to take place and has lessened the amount of power and time necessary for information to be communicated between machines.

Rich Communication Suite (RCS) is a communication protocol between mobile telephone carriers and between phone and carrier, aiming at replacing SMS messages with a text-message system that is richer, provides phonebook polling (e.g., for service discovery), and can transmit in-call multimedia. It is also marketed under the names of Advanced Messaging, Advanced Communications, Chat, Joyn, Message+ and SMS+.

RCS was first formed in 2007 and was taken over by the GSM Association (GSMA), the industry trade body that represents mobile operators worldwide, in 2008. In 2016, the GSMA agreed on a Universal Profile-a set of standards that all mobile operators, phone manufacturers and software providers can use to help implement RCS on devices.

RCS messaging is very much like WHATSAPP, where live chat can take place, including multi-media support, with everything handled via the data network. It's seen as a rival to APPLE's iMessage service, although there are some subtle differences between how these services operate.

The biggest advantage RCS Messaging has over SMS-and the reason it will be implemented in the first place—is that it will enable users to send rich, verified messages. This means electronic messages will be able to carry more information, so users can send things like photos, videos and audio messages to one another.

RCS messages can carry out video calls directly within the RCS messaging app, rather than having to rely on third-party software. Group messages are possible with RCS, and little things such as read receipts and indicators to show other users are typing a message will be included as well.

RCS messages rely on data in order to be sent between users, and so messages are sent with client-to-server encryption. The RCS protocol should also prevent spam messages from reaching a cell phone, as for a company to be able to send a message via RCS, they have to go through a brand verification process.

RCS includes features that GOOGLE Business Messages, APPLE iMessage, WHATAPP and FACEBOOK Messenger have offered for some time.

Internet of Things (IoT) wireless interfaces, include but are not limited to, wireless interfaces from security cameras, doorbells with real-time video cameras, baby monitors, televisions, set-top boxes, lighting, heating (e.g., smart thermostats, etc.), ventilation, air conditioning (HVAC) systems, and appliances such as washers, dryers, robotic vacuums, air purifiers, ovens, refrigerators, freezers, toys, game platform controllers, game platform attachments (e.g., googles, sports equipment, etc.), and/or other types of IoT and/or other types of network devices or combination thereof.

However, the present invention is not limited to such wireless connections 18 and wireless networks 20, 20'and more, fewer and/or other wireless interfaces can be used to practice the invention.

The control circuit 22 receives power from the power source 16 and sends and receives data from the wireless interface 18 from the wireless communications network 20, 20'.

In one embodiment, the control circuit 22 includes an integrated circuit (IC) or monolithic integrated circuit (also referred to as an IC, a chip, or a microchip). An integrated circuit is a set of electronic circuits on one small plate ("chip") of semiconductor material, normally silicon. However, the present invention is not limited to such an embodiment and other types of circuits can be used to practice the invention.

In one embodiment the control circuit 22 includes a processing system with one or more processors, including, but not limited to, one or more high speed Central Processing Unit(s) ("CPU") 24 or other types of processors 24, with a non-transitory computer readable medium 26 including a computer memory. The non-transitory computer readable medium 26 includes an operating environment for the present invention including, but not limited to, plural instructions 28 for controlling the one or more processors 26.

In accordance with the practices of persons skilled in the art of computer programming, the present invention is described with reference to acts and symbolic representations of operations or instructions 28 that are performed by the circuit 16, unless indicated otherwise. Such acts and operations and/or instructions 28 are referred to as being "computer-executed," "CPU executed" or "processor executed."

It will be appreciated that acts and symbolically represented operations or instructions include the manipulation of electrical signals by a CPU 24 and/or other processors 24. An electrical system represents data bits which cause a resulting transformation or reduction of the electrical signals, and the maintenance of data bits at memory locations in a memory system to thereby reconfigure or otherwise alter the CPU's or processors operation, as well as other processing of signals. The memory locations where data bits are maintained are physical locations that have particular electrical, magnetic, optical, or organic properties corresponding to the data bits.

The data bits may also be maintained on a non-transitory computer readable medium 26 including magnetic disks, optical disks, organic memory, and any other volatile (e.g., Random Access Memory ("RAM")) or non-volatile (e.g., Read-Only Memory ("ROM")) mass storage system readable by the CPU or other processor.

In one embodiment, the plural instructions 28, include an anti-theft software program and/or application 28' stored in the non-transitory computer readable medium 26. However, the present invention is not limited to such an embodiment and other embodiments may be used to practice the invention.

A diode 23, 23'is a two-terminal electronic component that conducts current primarily in one direction. It has low resistance in one direction and high resistance in the other. The first diode 23 only allows current to pass through in one direction, so it stops the current from carrying any voltage to power supply 16 of the apparatus 12 from any external sources including a battery and an electrical system of the vehicle 34 and/or from an electrical equipment used for tampering with the apparatus 12 by a person trying to defeat the apparatus 12.

The second diode 23' only allows current to pass through in one direction, so it stops the current from carrying any voltage to the battery and the electrical system of the vehicle 34 to prevent damage to the electrical system of the vehicle from the apparatus 12.

The Global Positioning System (GPS) component 30 includes a space-based global navigation satellite system (GNSS) that provides reliable location and time information in all weather and at all times and anywhere on or near the Earth. The GPS component 30 calculates its position by precisely timing signals sent by GPS satellites 56. The GPS component 30 uses the messages it receives to determine a transit time of each message and computes a distance to each GPS satellite 56. These distances along with the satellites'locations are used with the possible aid of triangulation, depending on which algorithm is used, to compute a GPS current physical location position 32 of the GPS component 30 and hence the vehicle 34.

In one embodiment, the GPS current physical position 32 is also displayed on network device 42-50 (FIG. 2, 62-70), perhaps with a real-time moving map 59 display (FIG. 6) for law enforcement 58 (e.g., at a street level, etc.) and/or latitude and longitude and/or elevation and/or speed and/or acceleration information may also be included. Many GPS components also calculate derived information such as travel direction and speed, calculated from position changes. The GPS information includes standard GPS, GPS map, Digital GPS (DGPS) and/or other types of GPS information.

The power wire connector 36 includes an electrical wire that connects to ignition wires and/or an ignition wire harness and/or other wires used to start the vehicle 34. The power wire connector 36 connects to a positive terminal 40*a* on the battery 40 for the vehicle 34 draws power for the apparatus 12 from the battery 40 in the vehicle 34. The power source 16 in the apparatus 12 includes a backup power source (e.g., a battery, etc.) should the power wire connector 36 from the apparatus 12 be intentionally disconnected from the battery 40 in the vehicle 34.

In one embodiment, the vehicle 34 includes an automobile, truck, snow machine, all-terrain vehicles (ATV), utility terrain vehicles (UTV), boat, ship, motorcycle, electronic bicycle, aircraft, train locomotive, etc. However, the present invention is not limited to such embodiments and other types of vehicles 34 can be used to practice the invention.

The ground wire connector 38 includes an electrical wire that the connects to ignition wires and/or an ignition wire harness and/or other wires in the vehicle 34. ground wire connector 38 includes a connection from the apparatus 12 to the negative terminal of the battery 40, via a connection to the engine or chassis in the vehicle 40 or the positive terminal 40*a* battery itself 40. A ground wire is a wire which supplies a path for battery current to flow. The ground wire connector 38 is used to intentionally generate a kill switch signal 54 by generating an electrical kill switch signal 54 directly to a negative terminal 40*b* on the battery 40 of the vehicle to kill the engine of the vehicle prevents a vehicle 34 from starting again regardless of how a vehicle thief damages, adapts, bypasses and/or circumvents an ignition switch for the vehicle 12.

In another embodiment, the kill switch signal 54 is sent to other electronic components in the vehicle 34 via a data bus and/or wireless and/or multimedia communications interface in the vehicle 34. Most modern vehicles have an Electronic Control Unit (ECU) and a data bus for sending and receiving control messages. In many vehicles 54 the data bus, includes, but is not limited to, a Controller Area Network (CAN) bus an inexpensive low-speed serial bus for interconnecting automotive components, a Domestic Digital Bus (DDB) bus a high-speed multimedia interface and/or a FlexRay bus, a bus with general purpose high-speed protocol with safety-critical features. However, the present invention is not limited to such an embodiment and other embodiments can be used to practice the invention.

The one or more network devices 42, 44, 46, 48, 50 (FIG. 2 62-70), each with one or more processors and each with a non-transitory computer readable medium, include smart phones and/or cell phones 42, electronic tablets 44, computers 46, smart speakers 48 used in a home or office environment and wearable devices 50 (FIG. 2 62-70) used on the body/clothing of a driver/owner 52 of a vehicle 34, and/or other types of network devices.

Figure 2:
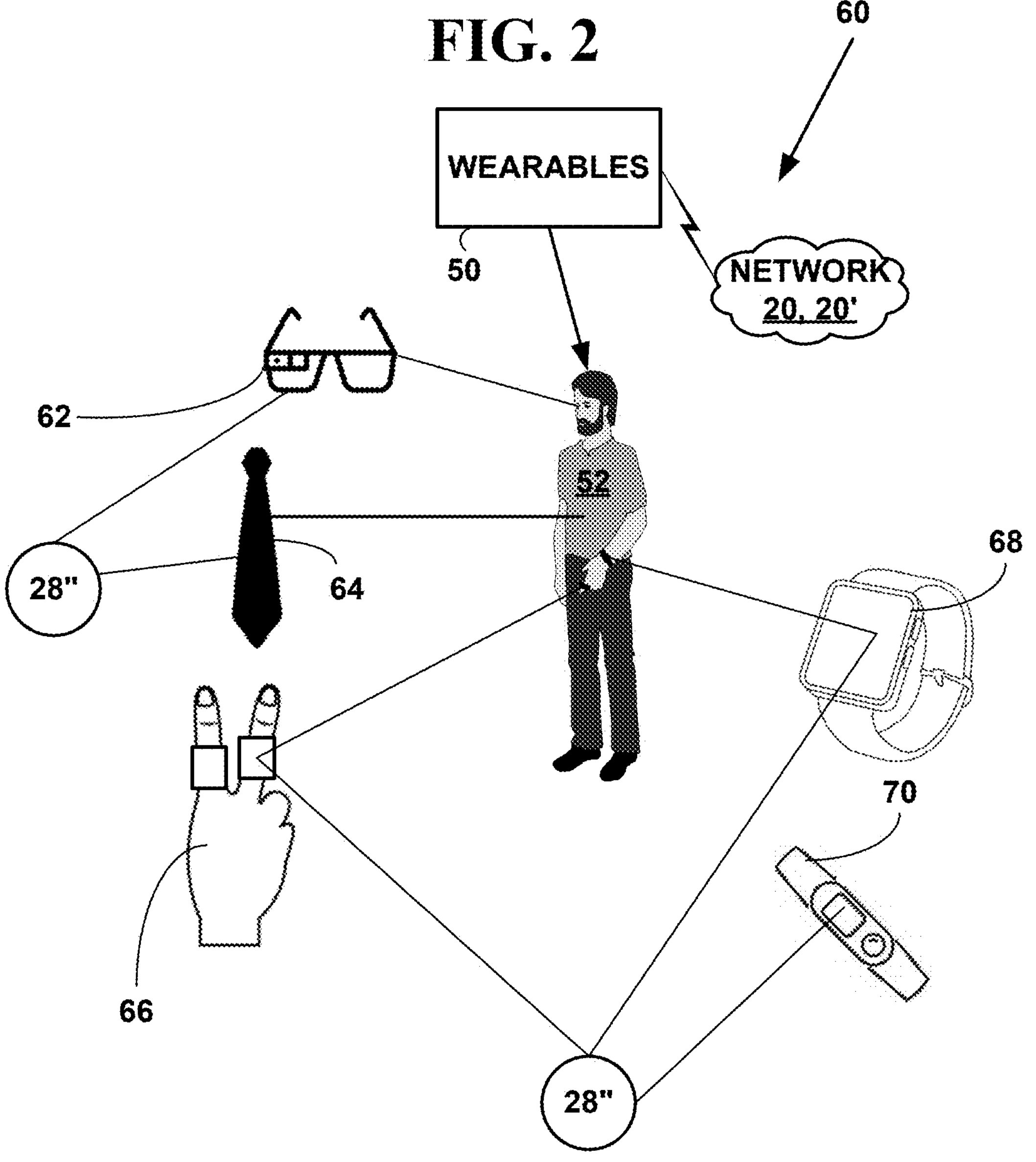
FIG. 2 is a block diagram illustrating wearable network devices.

FIG. 2 is a block diagram 60 illustrating wearable network devices 62-70.

Wearable technology" and/or "wearable devices" are clothing and accessories incorporating computer and advanced electronic technologies. The wearable devices 50 include one or more processors and include, but are not limited to, wearable digital glasses 62, clothing 64 (e.g., smart ties, etc.), jewelry 66 (e.g., smart rings, smart earrings, bracelets, etc.) and/or wrist ware (watches 68, bracelets, 70, etc.). However, the present invention is not limited to such embodiments and more, fewer and other types of wearable devices can also be used to practice the invention. The invention can also be practiced without wearable devices 66-70.

In one embodiment, the vehicle anti-theft apparatus 12 is a small size (e.g., about four inches by about four inches, about 10.16 centimeters (cm)×10.16) so it is not easily visible. However, the present invention is not limited to such sizes and the vehicle anti-theft apparatus 12 can comprise other sizes to practice the invention.

In one embodiment, the vehicle anti-theft apparatus 12 is placed in the passenger compartment of the vehicle 34. In other embodiment, the vehicle anti-theft apparatus 12 is placed somewhere on the chassis of the vehicle 34. In another embodiment, the vehicle anti-theft apparatus 12 is placed in the engine compartment of the vehicle in a place where it is not visible upon a routine visual inspection. In one specific embodiment the vehicle anti-theft apparatus 12 is included in an OBD component inserted into the OBD port on the vehicle. However, the present invention is not limited to such embodiments and the vehicle anti-theft apparatus 12 can be placed in other locations in and/or on the vehicle 34.

FIG. 3 is a flow diagram illustrating a Method 72 for sending a kill switch signal 54 to a vehicle anti-theft apparatus 12.

In FIG. 3 at Step 74, a wireless configuration message is sent from a network device with one or more processors via a wireless communications network to a vehicle anti-theft apparatus included in a vehicle including a unique identifier for the network device. At Step 76, the vehicle anti-theft apparatus stores the unique identifier for the network device in non-volatile storage on the vehicle anti-theft apparatus. At Step 78, the vehicle anti-theft apparatus receives a kill switch request message from the network device via the communications network for the vehicle after a car-jacking and/or vehicle theft. At Step 80, the vehicle anti-theft apparatus applies a kill switch signal to the vehicle to turn the vehicle off and prevent the vehicle from being restarted. At Step 82, the vehicle anti-theft apparatus sends a current GPS physical location of the vehicle to a law enforcement network device via the communications network.

FIG. 3 is illustrated with an illustrative embodiment. However, the present invention is not limited to this embodiment and other embodiments can be used to practice the invention.

In such an illustrative embodiment in FIG. 3 at Step 74, a wireless configuration message is sent from a network device 42, 44, 46, 48, 50, 66-70 with one or more processors via a wireless communications network 20, 20' to a vehicle anti-theft apparatus 12 included in a vehicle 34 including a unique identifier for the network device 42, 44, 46, 48, 50, 66-70.

In one embodiment, the unique identifier for the one or more network devices 42, 44, 46, 48, 50 (FIG. 2 62-70) included in the wireless initiation message is a unique hardware address (e.g., a Medium Access Control (MAC) address), network address (e.g., Internet Protocol (IP) address, etc.), phone number, user name, unique network identifier (e.g., Globally Unique Identifier (GUID), Universally Unique Identifier (UUID), encrypted token, stored contact, database record, cloud database record, email address, social media identifier, etc.) to uniquely identify the network device 42, 44, 46, 48, 50, 66-70 on the communications network 20, 20'. However, the present invention is not limited to this embodiment and other embodiments can be used to practice the invention.

In a preferred embodiment, a hardware address is used because every network device includes a unique hardware address (i.e., MAC, etc.) when they are manufactured and sold. Using the hardware address of the network device as the unique identifier prevents phone number spoofing of the vehicle anti-theft apparatus 12. For example, if a driver 52 of a vehicle 34 has a phone number of 262.654.1234 and a hardware address of MAC1 and someone tries to spoof the to a vehicle anti-theft apparatus 12 but has a network device with a spoofed phone number of 262.654.1234 with a hardware address of MAC2 would not be allowed to use the vehicle anti-theft apparatus 12 to turn the vehicle 34 on and/or off.

In one embodiment, the wireless configuration message is sent directly from a network device 42, 44, 46, 48, 50, 66-70 with one or more processors via a wireless communications network 20, 20'to a vehicle anti-theft apparatus 12 included in a vehicle 34 with a unique identifier for the network device 42, 44, 46, 48, 50, 66-70 including a telephone number for the network device 42, 44, 46, 48, 50, 66-70 as a telephone call.

In one embodiment, the wireless configuration message is sent directly from a network device 42, 44, 46, 48, 50, 66-70 with one or more processors via a wireless communications network 20, 20' to a vehicle anti-theft apparatus 12 included in a vehicle 34 with a unique identifier for the network device 42, 44, 46, 48, 50, 66-70 as other than a telephone call.

At Step 76, the vehicle anti-theft apparatus 12 stores the unique identifier for the network device 42, 44, 46, 48, 50, 66-70 in non-volatile storage in the computer readable medium 26 on the vehicle anti-theft apparatus 12

At Step 78, the vehicle anti-theft apparatus 12 receives a wireless kill switch request message from the network device 42, 44, 46, 48, 50, 66-70 via the communications network 20, 20' for the vehicle 34 after a car-jacking and/or vehicle theft.

At Step 80, the vehicle anti-theft apparatus applies a kill switch signal 54 to the vehicle 34 to turn the vehicle 34 off and prevent the vehicle 34 from being restarted. The vehicle remains disabled until the kill switch signal 54 is removed.

In one embodiment, the kill switch signal includes applying a grounding signal to the engine of the vehicle 34 and/or creating an open ground to turn it off. However, the present invention is not limited to such an embodiment and other embodiments can be used to practice the invention.

At Step 82, the vehicle anti-theft apparatus 12 sends a current GPS physical location 32 of the vehicle 34 to a law enforcement 58 network device 58' via the communications network 20, 20' in real-time (i.e., 1-2 seconds, etc.).

In one embodiment, the network device 42, 44, 46, 48, 50, 66-70 sends the wireless messages including, but not limited to, cellular telephone, IEEE 802.11a, 802.11b, 802.11g, 802.11n, 802.15.4 (ZigBee), Wi-Fi, WiMAX, HIPERMAN RF Home, Zigbee, Bluetooth, Infrared, ISM, NFC, M2M, SMS, RCS and/or or other long range or short-range wireless protocols via the communications network 20, 20'.

In one embodiment, the wireless messages including but are not limited to, telecommunications messages, short message services (SMS), direct messages (DM), instant messages (IM), Rich Communication Suite (RCS), social media messages, a combination thereof, and/or other types of wireless messages.

Short Message Service (SMS) Messaging

Short Message Service (SMS) is an electronic text messaging service component of phone, Web, or mobile communication systems. It uses standardized communications protocols to allow fixed line or mobile phone devices to exchange short text messages.

SMS messages were defined in 1985 as part of the Global System for Mobile Communications (GSM) series of standards as a means of sending messages of up to 160 characters to and from GSM mobile handsets. Though most SMS messages are mobile-to-mobile text messages, support for the service has expanded to include other mobile technologies as well as satellite and landline networks.

The SMS Internet Engineering Task Force (IETF) Request for Comments (RFC) 5724, ISSN: 2070-1721, 2010, is incorporated herein by reference.

Direct and Instant Messages

A "direct message" (DM) is a private form of communication between social media users that is only visible to the sender and recipient(s). INSTAGRAM, TWITTER, FACEBOOK and other platforms, allow for direct messages between their users, with varying restrictions by platform.

An "instant message" (IM) is a type of online chat allowing real-time text transmission over the Internet or another computer network. Messages are typically transmitted between two or more parties, when each user inputs text and triggers a transmission to the recipient, who are all connected on a common network.

Multimedia Messaging Service (mms)

Multimedia Messaging Service (MMS) is a standard way to send messages that include multimedia content to and from a mobile phone over a cellular network. Users and providers may refer to such a message as a PXT, a picture message, and/or a multimedia message.

The MMS Internet Engineering Task Force (IETF) Request for Comments (RFC) 4355 and 4356, are incorporated herein by reference.

In another embodiment, the network device 42, 44, 46, 48, 50, 66-70 uses an anti-theft application 28" included on the network device 42, 44, 46, 48, 50, 66-70 to send the wireless messages used in Method 72. In one embodiment, the anti-theft application 28'on the anti-theft apparatus 12 on the anti-theft application 28" on the network devices 42, 44, 46, 48, 50, 66-70 includes a cloud Software as a Service (SaaS) application interface used on a cloud communications network 20'. However, the present invention is not limited to such an embodiment and other embodiments can be used to practice the invention.

In one exemplary embodiment, the anti-theft applications 28', 28" are cloud applications, that offer cloud services via a cloud server network device 29 with one or more processors and one or more associated cloud databases 29'. The application 28', 28" offers a cloud computing Infrastructure as a Service (IaaS), including a cloud software infrastructure service, a cloud Platform as a Service (PaaS) including a cloud software platform service and/or offers Specific cloud software services as a Service (Saas) including a specific cloud software service for use with the anti-theft apparatus 12 for vehicle anti-theft services. The IaaS, PaaS and SaaS include one or more of cloud services comprising networking, storage, server network device, virtualization, operating system, middleware, run-time, data and/or application services, or plural combinations thereof, on the cloud communications network 20'. In another embodiment, the anti-theft applications 28', 28" that use one or more other server network devices (e.g., 110, FIG. 6, etc.), with one or more processors and associated data bases (e.g., 110', FIG. 6, etc.) to provide non-cloud anti-theft services for vehicles 34 via the anti-theft apparatus 12. However, the present invention is not limited to such an embodiment and other types of cloud 20'and non-cloud 20 communications networks, or a combination thereof of cloud 20'and non-cloud 20 communications networks can be used to practice the invention.

Security and Encryption

Network devices 12, 29, 42, 44, 46, 48, 50 (FIGS. 1), 58' (FIG. 6) 66-70 (FIGS. 2), 110 (FIG. 6) with wireless interfaces 18 of the present invention include one or more of the security and encryptions techniques discussed herein for secure communications on the cloud communications network 20' or non-cloud communications network 20.

Application programs 28', 28'', 28'''include security and/or encryption application programs. Security and/or encryption programs may also exist in hardware components on the network devices 12, 29, 42, 44, 46, 48, 50, 58', 66-70, 110 described herein and/or exist in a combination of hardware, software and/or firmware.

Wireless Encryption Protocol (WEP) (also called "Wired Equivalent Privacy) is a security protocol for WiLANs defined in the IEEE 802.11b standard.

WEP is cryptographic privacy algorithm, based on the Rivest Cipher 4(RC4 ) encryption engine, used to provide confidentiality for 802.11b wireless data.

RC4 is cipher designed by RSA Data Security, Inc. of Bedford, Massachusetts, which can accept encryption keys of arbitrary length, and is essentially a pseudo random number generator with an output of the generator being XORed with a data stream to produce encrypted data.

One problem with WEP is that it is used at the two lowest layers of the OSI model, the physical layer and the data link layer, therefore, it does not offer end-to-end security. One another problem with WEP is that its encryption keys are static rather than dynamic. To update WEP encryption keys, an individual has to manually update a WEP key. WEP also typically uses 40-bit static keys for encryption and thus provides "weak encryption," making a WEP device a target of hackers.

The IEEE 802.11 Working Group is working on a security upgrade for the 802.11 standard called "802.11i." This supplemental draft standard is intended to improve WiLAN security. It describes the encrypted transmission of data between systems 802.11X WiLANs. It also defines new encryption key protocols including the Temporal Key Integrity Protocol (TKIP). The IEEE 802.11i draft standard, version 4, completed Jun. 6, 2003, is incorporated herein by reference.

The 802.11i standard is based on 802.1x port-based authentication for user and device authentication. The **802.11*i*** standard includes two main developments: Wi-Fi Protected Access (WPA) and Robust Security Network (RSN).

WPA uses the same RC4 underlying encryption algorithm as WEP. However, WPA uses TKIP to improve security of keys used with WEP. WPA keys are derived and rotated more often than WEP keys and thus provide additional security. WPA also adds a message-integrity-check function to prevent packet forgeries.

RSN uses dynamic negotiation of authentication and selectable encryption algorithms between wireless access points and wireless devices. The authentication schemes proposed in the draft standard include Extensible Authentication Protocol (EAP). One proposed encryption algorithm is an Advanced Encryption Standard (AES) encryption algorithm.

Dynamic negotiation of authentication and encryption algorithms lets RSN evolve with the state of the art in security, adding algorithms to address new threats and continuing to provide the security necessary to protect information that WiLANs carry.

The NIST developed a new encryption standard, the Advanced Encryption Standard (AES) to keep government information secure. AES is intended to be a stronger, more efficient successor to Triple Data Encryption Standard (3DES).

DES is a popular symmetric-key encryption method developed in 1975 and standardized by ANSI in 1981 as ANSI X.3.92, the contents of which are incorporated herein by reference. As is known in the art, 3DES is the encrypt-decrypt-encrypt (EDE) mode of the DES cipher algorithm. 3DES is defined in the ANSI standard, ANSI X9.52-1998, the contents of which are incorporated herein by reference. DES modes of operation are used in conjunction with the NIST Federal Information Processing Standard (FIPS) for data encryption (FIPS 46-3, October 1999), the contents of which are incorporated herein by reference.

The NIST approved a FIPS for the AES, FIPS-197. This standard specified "Rijndael" encryption as a FIPS-approved symmetric encryption algorithm that may be used by U.S. Government organizations (and others) to protect sensitive information. The NIST FIPS-197 standard (AES FIPS PUB 197,November 2001) is incorporated herein by reference.

The NIST approved a FIPS for U.S. Federal Government requirements for information technology products for sensitive but unclassified (SBU) communications. The NIST FIPS Security Requirements for Cryptographic Modules (FIPS PUB 140-2, May 2001) is incorporated herein by reference.

RSA is a public key encryption system which can be used both for encrypting messages and making digital signatures. The letters RSA stand for the names of the inventors: Rivest, Shamir and Adleman. For more information on RSA, see U.S. Pat. No. 4,405,829, now expired and incorporated herein by reference.

"Hashing" is the transformation of a string of characters into a usually shorter fixed-length value or key that represents the original string. Hashing is used to index and retrieve items in a database because it is faster to find the item using the shorter hashed key than to find it using the original value. It is also used in many encryption algorithms.

Secure Hash Algorithm (SHA), is used for computing a secure condensed representation of a data message or a data file. When a message of any length $<2^{64}$ bits is input, the SHA-1 produces a 160-bit output called a "message digest." The message digest can then be input to other security techniques such as encryption, a Digital Signature Algorithm (DSA) and others which generates or verifies a security mechanism for the message. SHA-512 outputs a 512-bit message digest. The Secure Hash Standard, FIPS PUB 180-1, Apr. 17, 1995, is incorporated herein by reference.

Message Digest-5 (MD-5) takes as input a message of arbitrary length and produces as output a 128-bit "message digest" of the input. The MD5 algorithm is intended for digital signature applications, where a large file must be "compressed" in a secure manner before being encrypted with a private (secret) key under a public-key cryptosystem such as RSA. The IETF RFC-1321, entitled "The MD5 Message-Digest Algorithm" is incorporated here by reference.

Providing a way to check the integrity of information transmitted over or stored in an unreliable medium such as a wireless network is a prime necessity in the world of open computing and communications. Mechanisms that provide such integrity check based on a secret key are called "message authentication codes" (MAC). Typically, message authentication codes are used between two parties that share a secret key in order to validate information transmitted between these parties.

Keyed Hashing for Message Authentication Codes (HMAC), is a mechanism for message authentication using cryptographic hash functions. HMAC is used with any iterative cryptographic hash function, e.g., MD5, SHA-1, SHA-512, etc. in combination with a secret shared key. The cryptographic strength of HMAC depends on the properties of the underlying hash function. The IETF RFC-2101, entitled "HMAC: Keyed-Hashing for Message Authentication" is incorporated here by reference.

An Electronic Code Book (ECB) is a mode of operation for a "block cipher," with the characteristic that each possible block of plaintext has a defined corresponding cipher text value and vice versa. In other words, the same plaintext value will always result in the same cipher text value. Electronic Code Book is used when a volume of plaintext is separated into several blocks of data, each of which is then encrypted independently of other blocks. The Electronic Code Book has the ability to support a separate encryption key for each block type.

Diffie and Hellman (DH) describe several different group methods for two parties to agree upon a shared secret in such a way that the secret will be unavailable to eavesdroppers. This secret is then converted into various types of cryptographic keys. A large number of the variants of the DH method exist including ANSI X9.42. The IETF RFC-2631, entitled "Diffie-Hellman Key Agreement Method" is incorporated here by reference.

The HyperText Transport Protocol (HTTP) Secure (HTTPs), is a standard for encrypted communications on the World Wide Web. HTTPs is actually just HTTP over a Secure Sockets Layer (SSL). For more information on HTTP, see IETF RFC-2616 incorporated herein by reference.

The SSL protocol is a protocol layer which may be placed between a reliable connection-oriented network layer protocol (e.g. TCP/IP) and the application protocol layer (e.g. HTTP). SSL provides for secure communication between a source and destination by allowing mutual authentication, the use of digital signatures for integrity, and encryption for privacy.

The SSL protocol is designed to support a range of choices for specific security methods used for cryptography, message digests, and digital signatures. The security methods are negotiated between the source and destination at the start of establishing a protocol session. The SSL 2.0 protocol specification, by Kipp E.B. Hickman, 1995 is incorporated herein by reference. More information on SSL is available at the domain name See "netscape.com/eng/security/SSL_2.html."

Transport Layer Security (TLS) provides communications privacy over the Internet. The protocol allows client/server applications to communicate over a transport layer (e.g., TCP) in a way that is designed to prevent eavesdropping, tampering, or message forgery. For more information on TLS see IETF RFC-2246, incorporated herein by reference.

In one embodiment, the security functionality includes Cisco Compatible Extensions (CCX). CCX includes security specifications for makers of 802.11xx wireless LAN chips for ensuring compliance with Cisco's proprietary wireless security LAN protocols. As is known in the art, Cisco Systems, Inc. of San Jose, California is supplier of networking hardware and software, including router and security products.

However, the present invention is not limited to such security and encryption methods described herein and more, fewer and/or other types of security and encryption methods can be used to practice the invention. The security and encryption methods described herein can also be used in various combinations and/or in different layers of a protocol stack with each other.

In one embodiment, the wireless messages sent and received in Method 72 are secure wireless message using one or more the security and/or encryption techniques described herein providing a level of security and privacy to prevent hacking. However, the present invention is not limited to such an embodiment and other embodiments can be used to practice the invention.

FIG. 4 is a flow diagram illustrating a Method 84 for sending a kill switch signal 54 to a vehicle anti-theft apparatus 12.

In FIG. 4 at Step 86, a vehicle anti-theft apparatus receives a kill switch request message from the network device via the communications network for a vehicle after a car-jacking and/or vehicle theft. The kill switch message includes a unique identifier for the network device. At Step 88, the vehicle anti-theft apparatus applies a kill switch signal to the vehicle to turn the vehicle off and prevent the vehicle from being restarted. At Step 90, the vehicle anti-theft apparatus sends a current GPS physical location of the vehicle to a law enforcement network device via the communications network. At Step 92, the vehicle anti-theft apparatus receives a remove kill switch request message from the network device via the communications network. At Step 94, the vehicle anti-theft apparatus removes the kill switch signal to allow the vehicle to be restarted.

FIG. 4 is illustrated with an illustrative embodiment. However, the present invention is not limited to this embodiment and other embodiments can be used to practice the invention.

In such an illustrative embodiment in FIG. 4 at Step 86, a vehicle anti-theft apparatus 12 receives a kill switch 53 request message from the network device 42, 44, 46, 48, 50, 66-70 via the communications network 20 for a vehicle 34 after a car-jacking and/or vehicle theft. The kill switch message includes a unique identifier for the network device 42, 44, 46, 48, 50, 66-70.

In one embodiment, the vehicle anti-theft apparatus 12 is permanently paired with one specific network device 42, 44, 46, 48, 50, 66-70 based on the unique network identifier and cannot be used with any other network device. For example, if the vehicle anti-theft apparatus 12 was permanently paired with cell phone 42, then if other network devices 44, 46, 48, 50, 66-70 contact the anti-theft apparatus 12, all requests to the anti-theft apparatus 12 would be ignored and the vehicle 32 cannot be disabled by the anti-theft apparatus other network devices 44, 46, 48, 50, 66-70. In another embodiment, the anti-theft apparatus 12 is not permanently paired to a network device network device 42, 44, 46, 48, 50, 66-70 and can be dynamically changed from a pairing from a first network device 42 to a new second network device (e.g., a driver 54 obtains a new cell phone 42, etc.). However, in such an embodiment, the anti-theft apparatus 12 will only work with one specific network device 42, 44, 46, 48, 50, 66-70 and is only paired with one specific network device at time. However, the present invention is not limited to these embodiments and other embodiments can be used to practice the invention.

In one embodiment, the unique identifier for the network device 42, 44, 46, 48, 50, 66-70 includes unique hardware address (e.g., a Medium Access Control (MAC) address), network address (e.g., Internet Protocol (IP) address, etc.), phone number, user name, unique network identifier (e.g., Globally Unique Identifier (GUID), Universally Unique Identifier (UUID), encrypted token, stored contact, database record, cloud database record, email address, social media identifier, etc.) to uniquely identify the network device 42, 44, 46, 48, 50, 66-70 on the communications network 20. However, the present invention is not limited to this embodiment and other embodiments can be used to practice the invention.

At Step 88, the vehicle anti-theft apparatus applies 12 a kill switch 54 signal to the vehicle 12 to turn the vehicle 12 off and prevent the vehicle 12 from being restarted.

At Step 90, the vehicle anti-theft apparatus 12 sends a current GPS physical location 32 of the vehicle 34 to a law enforcement 58 network device 58' via the communications network 20.

At Step 92, the vehicle anti-theft apparatus 12 receives a remove kill switch request message from the network device 42, 44, 46, 48, 50, 66-70 via the communications network 20.

In one embodiment, the remove kill switch request message is sent after law enforcement 58 has successfully recovered the vehicle 34 at a car-jacking and/or vehicle theft. However, the present invention is not limited to such an embodiment and other embodiments can be used to practice the invention.

At Step 94, the vehicle anti-theft apparatus 12 removes the kill switch signal to allow the vehicle 34 to be restarted.

When using Method 84, the vehicle anti-theft apparatus 12 is configured at the factory with a unique identifier and/or the anti-theft apparatus 12 sends a one-time configuration sequence to a network device 42, 44, 46, 48, 50, 66-70 to ask for a unique identifier to store on the anti-theft apparatus 12 to prevent spoofing. However, the present invention is not limited to such embodiments and other embodiments can be used to practice the invention.

In one embodiment, the wireless messages sent and received in Method 84 are secure wireless message using one or more the security and/or encryption techniques described herein providing a level of security and privacy to prevent hacking. However, the present invention is not limited to such an embodiment and other embodiments can be used to practice the invention.

Figure 5:
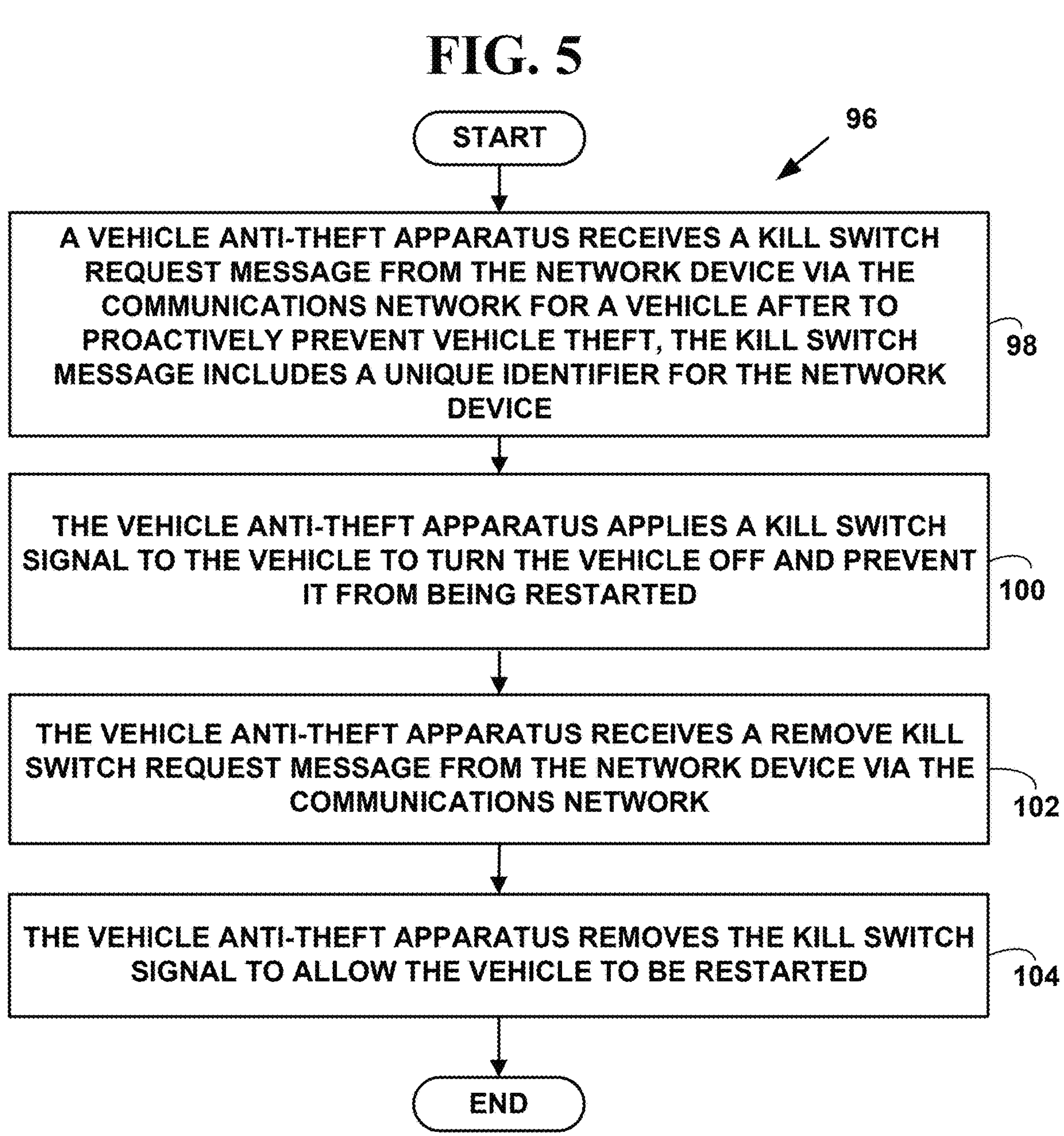
FIG. 5 is a flow diagram illustrating a method for sending a kill switch signal to a vehicle anti-theft apparatus.

FIG. 5 is a flow diagram illustrating a Method 96 for sending a kill switch signal to a vehicle anti-theft apparatus 12.

In FIG. 5 at Step 98 a vehicle anti-theft apparatus receives a kill switch request message from the network device via the communications network to proactively prevent theft of the vehicle. The kill switch message includes a unique identifier for the network device. At Step 100, the vehicle anti-theft apparatus applies a kill switch signal to the vehicle to turn the vehicle off and prevent the vehicle from being restarted. At Step 102, the vehicle anti-theft apparatus receives a remove kill switch request message from the network device via the communications network. At Step 104, the vehicle anti-theft apparatus removes the kill switch signal to allow the vehicle to be restarted.

FIG. 5 is illustrated with an illustrative embodiment. However, the present invention is not limited to this embodiment and other embodiments can be used to practice the invention.

In such an illustrative embodiment in FIG. 5 at Step 98 a vehicle anti-theft apparatus 12 receives a kill switch 54 request message from the network device 42, 44, 46, 48, 50, 66-70 via the communications network 20 to proactively prevent theft of the vehicle 34. The kill switch 54 message includes a unique identifier for the network device 42, 44, 46, 48, 50, 66-70.

In one embodiment, the unique identifier for the network device 42, 44, 46, 48, 50, 66-70 includes unique hardware address (e.g., a Medium Access Control (MAC) address), network address (e.g., Internet Protocol (IP) address, etc.), phone number, user name, unique network identifier (e.g., Globally Unique Identifier (GUID), Universally Unique Identifier (UUID), encrypted token, stored contact, database record, cloud database record, email address, social media identifier, etc.) to uniquely identify the network device 42, 44, 46, 48, 50, 66-70 on the communications network 20. However, the present invention is not limited to this embodiment and other embodiments can be used to practice the invention.

At Step 100, the vehicle anti-theft apparatus 12 applies a kill switch signal 54 to the vehicle 34 to turn the vehicle 34 off and prevent the vehicle 34 from being restarted.

At Step 102, the vehicle anti-theft apparatus 12 receives a remove kill switch request message from the network device 42, 44, 46, 48, 50, 66-70 via the communications network 20.

At Step 104, the vehicle anti-theft apparatus 12 removes the kill switch signal to allow the vehicle 34 to be restarted.

In one embodiment, the wireless messages sent and received in Method 96 are secure wireless message using one or more the security and/or encryption techniques described herein providing a level of security and privacy to prevent hacking. However, the present invention is not limited to such an embodiment and other embodiments can be used to practice the invention.

Figure 6:
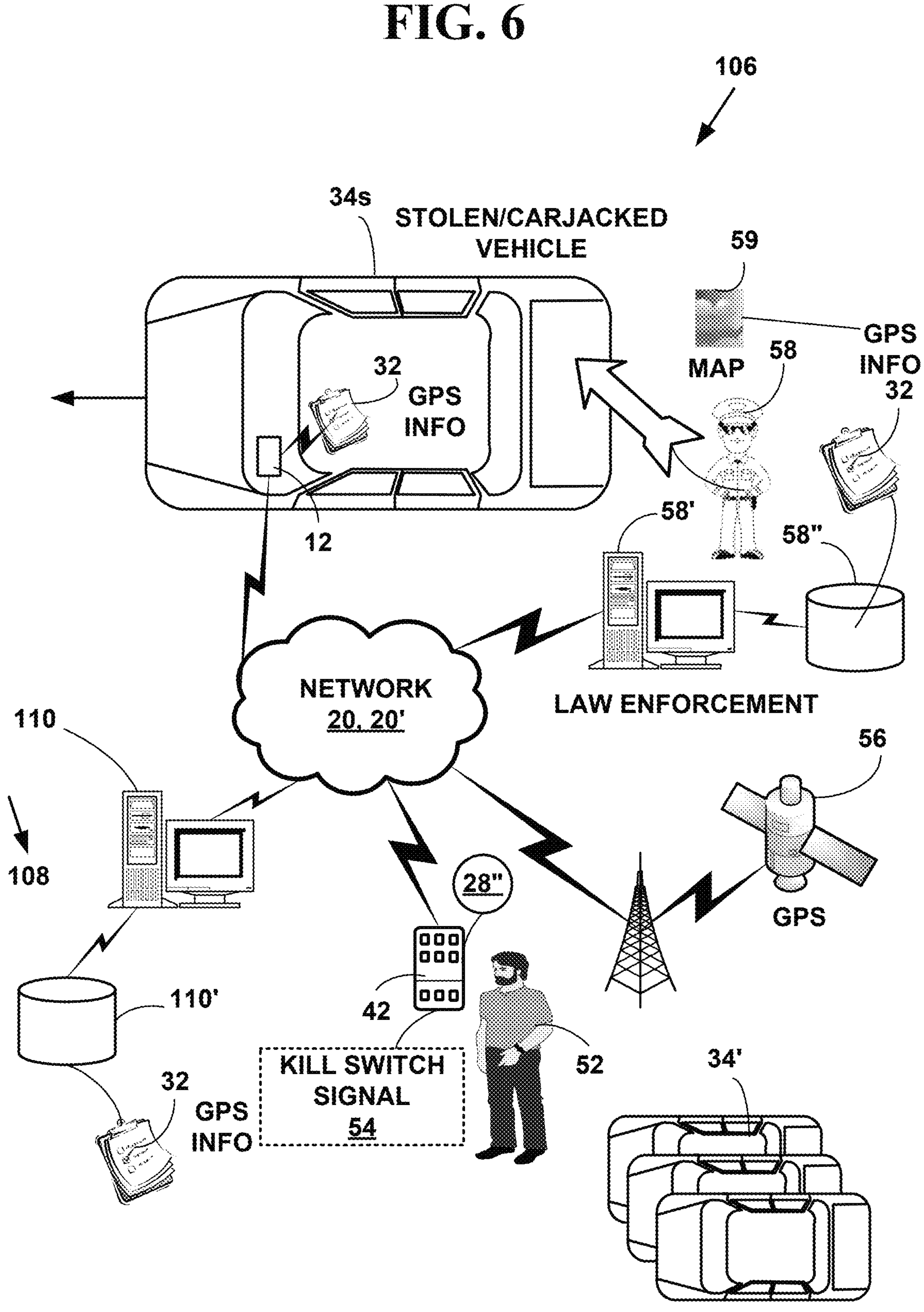
FIG. 6 is a block diagram illustrating a data flow for the methods for sending a kill switch signal a vehicle anti-theft apparatus.

FIG. 6 is a block diagram illustrating a data flow 106 for the Methods 72, 84 for sending a kill switch signal a vehicle anti-theft apparatus 12.

In FIG. 6, a vehicle **34*s* is stolen and/or carjacked. The driver of the vehicle 52 sends a wireless kill switch message to the vehicle anti-theft apparatus 12 from a network device (e.g., cell phone 42, etc.) via the wireless communication network 20. The vehicle anti-theft apparatus 12 receives the wireless kill switch message and applies the kill switch signal 54 to the vehicle 34 to disable it. The vehicle anti-theft apparatus 12 sends the current GPS physical location information 32 of the vehicle 54 to a law enforcement server network device 58" with one or more processors via the wireless communications network 20. Law enforcement server network device 58' stores the current GPS physical location information 32 of the vehicle 54 in an associated law enforcement database 58" to locate the vehicle 54 and use as evidence for arrest charges and corresponding court cases. Law enforcement 58 is dispatched to recover the disabled vehicle 34 and ideally arrest the vehicle thief. In one embodiment, law enforcement 54 uses a real-time moving map display 59 to track and locate the disabled vehicle 34**. However, the present invention is not limited to such embodiments and other embodiments can be used to practice the invention.

In one embodiment, the vehicle anti-theft apparatus 12 includes a theft prevention system with one or more server network devices 110 (only one of which is illustrated) with associated databases 110' (including cloud bases) to allow the vehicle anti-theft apparatus 12 to be placed in plural vehicles 34 to proactively disable vehicles 34 to prevent theft, aid repossession for vehicles 34 with driver/owners 52 that have not paid their vehicle payments to a bank, credit union, financing company, for rental car companies for driver 52 that have not returned their rental cars, etc. However, the present invention is not limited to such an embodiment and other embodiments can be used to practice the invention, with and/or without the theft prevention system 108.

FIGS. 7A and 7B is a flow diagram illustrating a Method 112 for sending a kill switch signal to a vehicle anti-theft apparatus 12.

In FIG. 7A at Step 114, placing the vehicle anti-theft apparatus in plural vehicles. At Step 116, placing in a database with a vehicle anti-theft application on a server network device with one more processors, information including a first set of plural unique identifiers about a first set of vehicles from the plural vehicles to proactively disable the first set of vehicles to help prevent theft of the first set of vehicles. At Step 118, placing in the database with the vehicle anti-theft application on the server network device information including a second set of plural unique identifiers about a second set of vehicles from the plural vehicles to aid repossession for the second set of vehicles with drivers that have not paid their vehicle payments to a bank, credit union or financing company. At 120, placing in the database with the vehicle anti-theft application on the server network device a third set of information including a third set of unique identifiers about a third set rental car vehicles including information for drivers that have not returned their rental vehicles. In FIG. 7B at Step 122, receiving on the vehicle anti-theft application on the server network device a wireless kill switch message after a selected vehicle from the plural vehicles is stolen, carjacked, requires repossession, or rental company return from a first network device via the wireless communication network. At Step 124, applying from the vehicle anti-theft application on the server network device a wireless kill switch signal with information from the database about the selected vehicle to disable the selected vehicle.

FIG. 7 is illustrated with an illustrative embodiment. However, the present invention is not limited to this embodiment and other embodiments can be used to practice the invention.

In such an illustrative embodiment in FIG. 7A at Step 114, placing the vehicle anti-theft apparatus 12 in plural vehicles 34' (FIG. 6).

At Step 116, placing in a database 29' with a vehicle anti-theft application **28*s* on a server network device 29** with one more processors, information including a first set of plural unique identifiers about a first set of vehicles from the plural vehicles to proactively disable the first set of vehicles to help prevent theft of the first set of vehicles.

At Step 118, placing in the database 29' with the vehicle anti-theft application **28*s* on the server network device 20'**, information including second set of a plural unique identifiers a second set of vehicles from the plural vehicles 34'to aid repossession for the second set of vehicles with drivers that have not paid their vehicle payments to a bank, credit union or financing company.

At 120, placing in the database 29' with the vehicle anti-theft application **28*s* on the server network device 29**, information including a third set of unique identifiers about a third set rental car vehicles including information for drivers that have not returned their rental vehicles.

In FIG. 7B at Step 122, receiving on the vehicle anti-theft application **28*s* on the server network device 29 a wireless kill switch message after a selected vehicle 34*s* from the plural vehicles 34 is stolen, carjacked, requires repossession, or rental company return from a first network device 42-50 via the wireless communication network 20, 20'**.

At Step 124, applying from the vehicle anti-theft application **28*s* on the server network device 29 a wireless kill switch signal with information from the database 29' about the selected vehicle 34 to disable the selected vehicle 34 (FIG. 6**).

Artificial Intelligence (AI) and Big Data

"Artificial intelligence" (AI), also known as machine intelligence (MI), is intelligence demonstrated by machines, in contrast to the natural intelligence (NI) displayed by humans and other animals. AI research is defined as the study of "intelligent agents." Intelligent agents are any software application or hardware device that perceives its environment and takes actions that maximize its chance of successfully achieving its goals. Colloquially, the term "artificial intelligence" is applied when a machine mimics "cognitive" functions that humans associate with human brains, such as learning, problem solving and comparing large number of data points.

In one embodiment, the present invention uses one or more AI methods including, but are not limited to, AI knowledge-based methods for vehicle anti-theft application. The AI knowledge-based methods include, but are not limited to, AI knowledge-based methods for determining car-jacking or vehicle theft events and responses, repossession events and responses, rental car rental and rental car return events and responses and/or a precise geographical location with GPS and a precise date and/Or time of such events and responses. However, the present invention is not limited to such an embodiment and more, fewer and/or other AI methods can be used to practice the invention.

In one embodiment, SaaS cloud software application includes and AI application with the AI methods described herein. In another embodiment, the AI application is a standalone application. However, the present invention is not limited to such an embodiment, and the AI application can be provided in other than the SaaS.

"Big Data" refers to the use of predictive analytic methods that extract value from data, and to a particular size of data set. The quantities of data used are very large, at least 100,000 data points and more typically 500,000 to 1 Million+ data points. Analysis of Big Data sets are used to find new correlations and to spot trends. In one embodiment, SaaS includes and Big Data application with the Big Data described herein.

In one embodiment, the AI methods described herein collect data information to create and store (e.g., in cloud storage object 92, etc.) a Big Data that is used to analyze trends find new correlations and to spot trends. However, the present invention is not limited to such an embodiment and the AI methods described herein can be used without Big Data sets.

A vehicle anti-theft apparatus and method is presented herein. The vehicle anti-theft apparatus and method includes a wireless interface to receive wireless messages from other network devices (e.g., smart phones, tablets, wearables, etc.) to apply a kill switch signal to a vehicle to disable a vehicle and prevent the vehicle from being restarted, provide Global Positioning System (GPS) physical location information of the vehicle to law enforcement in real-time (i.e., 1 to 2 seconds), and remove the kill switch signal to allow the vehicle to be restarted. The kill switch signal proactively prevents vehicle theft and also helps law enforcement locate the disabled vehicle after a car theft and/or car-jacking.

It should be understood that the architecture, programs, processes, methods and systems described herein are not related or limited to any particular type of computer or network system (hardware or software), unless indicated otherwise. Various types of computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

While various elements of the preferred embodiments have been described as being implemented in software, in other embodiments hardware or firmware implementations may alternatively be used, and vice-versa.

I claim:

1. A vehicle anti-theft system, comprising in combination:

a vehicle anti-theft apparatus including:

a case component, a power supply, a wireless interface, for receiving wireless signals and wireless messages from a wireless communications network, with a wireless protocol including a Machine-2-Machine (M2M) wireless protocol;

a control circuit, for controlling the vehicle anti-theft apparatus, a first diode connected to the control circuit to stop any electrical current from carrying any voltage to the power supply of the vehicle anti-theft apparatus from any external sources including a battery and to stop any electrical current from carrying any voltage to an electrical system of the vehicle or from other electrical equipment used for tampering with the vehicle anti-theft apparatus trying to defeat the vehicle anti-theft apparatus, a processor for processing wireless data, a non-transitory computer readable medium for including a plurality of instructions for controlling the processor, the processor and the plurality of instructions including a software application configured for sending a wireless configuration message via the wireless interface and the M2M wireless protocol to a desired network device with one or more processors and a non-transitory computer readable medium including non-volatile storage asking for a unique network hardware Medium Access Control (MAC) identifier for the network device and configured for receiving the unique network hardware MAC identifier from the network device via the wireless interface and the M2M wireless protocol to store in non-volatile storage on the vehicle anti-theft apparatus to prevent spoofing by other network devices, a Global Positioning System (GPS) component, for providing GPS physical geographic location information for the vehicle, a power wire connector to supply power to the vehicle anti-theft apparatus from the vehicle, a second diode connected to the power wire connector to stop any electrical current from the vehicle anti-theft apparatus from carrying any voltage into the electrical system of the vehicle to prevent damage of the electrical system of the vehicle, and a ground wire connector to provide a ground to the vehicle anti-theft apparatus from the vehicle, the power wire connector and the ground wire connector connected to the battery for the vehicle, wherein the ground wire connector is used to intentionally generate a kill switch signal by generating an electrical kill switch signal directly to a negative terminal on a battery of the vehicle to kill the engine of the vehicle and to prevent the vehicle from starting again if an ignition switch for the vehicle is damaged, circumvented or bypassed;

the non-volatile storage on the vehicle anti-theft apparatus for storing the unique network hardware MAC identifier received in the configuration message for the desired network device; and the desired network device identified by the unique network hardware MAC identifier, configured for allowing a driver of the vehicle to send the a kill switch signal from the network device with the M2M wireless protocol devices via the wireless communications network to disable the vehicle after it has been carjacked or stolen, the GPS location information for the vehicle obtained from a GPS-satellite and immediately provided to law enforcement in real-time via the wireless communications network.

2. The vehicle anti-theft system of claim 1, wherein the case component includes, plastic, rubber, wood, metal, paper, composite materials, or a combination thereof.

3. The vehicle anti-theft system of claim 1, wherein the power supply a Direct Current (DC) or an Alternating Current (AC) power supply.

4. The vehicle anti-theft system of claim 1, wherein the power supply includes a backup power supply to prevent tampering.

5. The vehicle anti-theft system of claim 1, wherein the wireless interface further includes: an IEEE 802.11a, 802.11b, 802.11g, 802.11n, 802.15.4 (ZigBee), Wireless Fidelity (Wi-Fi), Worldwide Interoperability for Microwave Access (WiMAX), ETSI High Performance Radio Metropolitan Area Network (HIPERMAN), RF Home, BLUETOOTH (IEEE 802.15.1), Infra Data Association (IrDA), Radio Frequency Identifier (RFID), Near Field Communications (NFC), smart speaker, or Internet of Things (IoT), wireless interface.

6. The vehicle anti-theft system of claim 1, wherein the wireless messages include one or more of: telecommunications, short message services (SMS), direct messages (DM), instant messages (IM), Rich Communication Suite (RCS), social media messages, or a combination thereof, wireless messages.

7. The vehicle anti-theft system of claim 1, wherein the communications network includes: Internet, wireless intranet, wireless Local Area Network (WiLAN), wireless LAN (WILAN), wireless Wide Area Network (WiWAN), wireless Metropolitan Area Network (WiMAN), wireless Public Switched Telephone Network (WiPSTN), wireless personal area network (WPAN), wireless mesh network, cloud network, satellite network or combinations thereof, wireless communications networks.

8. The vehicle anti-theft system of claim 1, wherein an integrated circuit (IC) an IC, a chip, or a microchip, with one or more processors and a non-transitory computer readable medium.

9. The vehicle anti-theft system of claim 1, wherein the second diode only allows current to pass through in one direction, the second diode stopping the current from carrying any voltage to the battery and the electrical system of the vehicle to prevent damage to the electrical system of the vehicle from the vehicle anti-theft apparatus.

10. The vehicle anti-theft system of claim 1, wherein the kill switch signal is generated on a data bus or wireless multimedia communications interface in the vehicle.

11. The vehicle anti-theft system of claim 1, wherein one or more network devices include: smart phones, cell phones, electronic tablets, computers, smart speakers, wearable devices, or combination thereof.

12. The vehicle anti-theft system of claim 1, further comprising:

sending a wireless configuration message from a first network device with one or more processors via a wireless communications network to a vehicle anti-theft apparatus included in a vehicle, the first wireless message including a unique identifier for the network device;

storing in the vehicle anti-theft apparatus the unique identifier for the network device in non-volatile storage on the vehicle anti-theft apparatus;

receiving on the vehicle anti-theft apparatus a kill switch request message from the network device via the communications network for the vehicle after a car-jacking or vehicle theft;

applying from the vehicle anti-theft apparatus a kill switch signal to the vehicle to turn the vehicle off and prevent the vehicle from being restarted; and sending from the vehicle anti-theft apparatus a current GPS physical location of the vehicle to a law enforcement network device via the communications network.

13. The vehicle anti-theft system of claim 12, wherein the unique identifier for the network device includes: a unique hardware address, including a network address or Internet Protocol (IP) address, phone number, user name, unique network identifier including a Globally Unique Identifier (GUID), Universally Unique Identifier (UUID), encrypted token, stored contact, database record, cloud database record, email address, or social media identifier, or combination thereof, to uniquely identify the network device on the communications network.

14. The vehicle anti-theft system of claim 1, further comprising:

receiving a kill switch request message on the vehicle anti-theft apparatus from the network device via the communications network for the vehicle after a car-jacking or vehicle theft, the kill switch message includes a unique identifier for the network device;

applying from the vehicle anti-theft apparatus the kill switch signal to the vehicle to turn the vehicle off and prevent the vehicle from being restarted;

sending from the vehicle anti-theft apparatus a current GPS physical location of the vehicle to a law enforcement network device via the communications network; and receiving on the vehicle anti-theft apparatus a remove kill switch request message from the network device via the communications network; and removing from the vehicle anti-theft apparatus the kill switch signal to allow the vehicle to be restarted.

15. The vehicle anti-theft system of claim 1, further comprising:

receiving on the vehicle anti-theft apparatus a wireless kill switch message after the vehicle is stolen or carjacked from a first network device via the wireless communication network;

applying from the anti-theft apparatus a kill switch signal the vehicle to the vehicle to disable it; and sending from the vehicle anti-theft apparatus current GPS physical location information of the vehicle to a law enforcement server network device with one or more processors via the wireless communications network, wherein the law enforcement server network device stores the current GPS physical location information of the vehicle in an associated law enforcement database to locate the vehicle and use as evidence for arrest charges and corresponding court cases, wherein law enforcement is dispatched to recover the disabled vehicle and arrest a vehicle thief.

16. The vehicle anti-theft system of claim 1, further comprising:

placing the vehicle anti-theft apparatus in a passenger compartment of the vehicle, on a chassis of the vehicle in an engine compartment of the vehicle or in an On Board Diagnostic (OBD) port on the vehicle.

17. The vehicle anti-theft system of claim 1, further comprising:

placing the vehicle anti-theft apparatus in a plurality of vehicles;

placing in a database with a vehicle anti-theft application on a server network device with one more processor, a first set of information including a first set of a plurality of unique identifiers about a first set of vehicles from the plurality of vehicles to proactively disable the first set of vehicles to help prevent theft of the first set of vehicles;

placing in the database with the vehicle anti-theft application on the server network device a second set of information including a second set of a plurality of unique identifiers about a second set of vehicles from the plurality of vehicles to aid repossession for the second set of vehicles with drivers that have not paid their vehicle payments to a bank, credit union, financing company;

placing in the database with the vehicle anti-theft application on the server network device information about a third set rental car vehicles including information for drivers that have not returned their rental vehicles;

receiving on the vehicle anti-theft application on the server network device a wireless kill switch message after a selected vehicle from the plurality of vehicles is stolen, carjacked, requires repossession, or rental company return from a first network device via the wireless communication network; and applying from the vehicle anti-theft application on the server network device a wireless kill switch signal with information from the database about the selected vehicle to the selected vehicle to disable the vehicle.

18. The vehicle anti-theft system of claim 1, wherein the communications network includes a cloud communications network with one or more cloud databases, a cloud computing Infrastructure as a Service (IaaS), a cloud Platform as a Service (PaaS) and one or more cloud Software as a Service (SaaS) services including a specific cloud software service for vehicle anti-theft services.

19. The vehicle anti-theft system of claim 1, wherein the wireless interface includes one or more security and encryptions techniques to provide secure wireless communications.

20. The vehicle anti-theft system of claim 1, wherein the non-transitory computer readable medium further includes an Artificial Intelligence (AI) application for vehicle anti-theft services.

21. The vehicle anti-theft system of claim 1 further comprising:

a server vehicle anti-theft application on a server network device with one more processors with a database for storing information about a plurality of vehicles including a unique identifier for each vehicle, the server vehicle anti-theft application on the server network device including Artificial Intelligence (AI) knowledge-based methods for determining car-jacking or vehicle theft events and responses, repossession events and responses, rental car rental and rental car return events and responses, a precise geographical location with GPS and a precise date and time of such events and responses, and the server vehicle anti-theft application on the server network device also configured for sending the kill switch signal via the wireless communications network to disable the vehicle after it has been carjacked, stolen or repossessed.

* * * * *